(12) United States Patent
Spencer et al.

(10) Patent No.: US 9,066,227 B2
(45) Date of Patent: Jun. 23, 2015

(54) HOTSPOT NETWORK ACCESS SYSTEM AND METHOD

(75) Inventors: Ron Spencer, Ottawa (CA); Tom Camps, Stittsville (CA); Chris Burchett, Ottawa (CA); Brad Gagne, Kanata (CA); Rob Madge, Kanata (CA)

(73) Assignee: Datavalet Technologies, Montreal QC (CA)

( * ) Notice: Subject to any disclaimer, the term of this patent is extended or adjusted under 35 U.S.C. 154(b) by 215 days.

(21) Appl. No.: 13/384,580

(22) PCT Filed: Dec. 10, 2009

(86) PCT No.: PCT/CA2009/001806
§ 371 (c)(1),
(2), (4) Date: Apr. 2, 2012

(87) PCT Pub. No.: WO2011/006231
PCT Pub. Date: Jan. 20, 2011

(65) Prior Publication Data
US 2012/0192258 A1    Jul. 26, 2012

Related U.S. Application Data

(60) Provisional application No. 61/226,489, filed on Jul. 17, 2009.

(51) Int. Cl.
G06F 15/16  (2006.01)
H04W 12/06  (2009.01)
H04W 12/08  (2009.01)
H04W 74/00  (2009.01)

(52) U.S. Cl.
CPC .............. *H04W 12/06* (2013.01); *H04W 12/08* (2013.01); *H04W 74/00* (2013.01)

(58) Field of Classification Search
CPC ...... H04W 12/06; H04W 74/00; H04W 12/08
See application file for complete search history.

(56) References Cited

U.S. PATENT DOCUMENTS

| 7,546,276 | B2 | 6/2009 | Randle et al. |
| 7,610,049 | B2 | 10/2009 | Watanabe |
| 8,024,567 | B2 | 9/2011 | Han |
| 8,151,319 | B2 | 4/2012 | Dhand et al. |
| 8,166,524 | B2 | 4/2012 | Sentinelli |
| 8,391,909 | B2 * | 3/2013 | Stewart .................. 455/518 |
| 2002/0103801 | A1 | 8/2002 | Lyons |
| 2002/0173981 | A1* | 11/2002 | Stewart .................... 705/1 |
| 2002/0176579 | A1* | 11/2002 | Deshpande et al. ....... 380/270 |
| 2004/0181692 | A1 | 9/2004 | Wild et al. |

(Continued)

FOREIGN PATENT DOCUMENTS

WO      03077572 A1     9/2003

*Primary Examiner* — Taghi Arani
*Assistant Examiner* — Sharon Lynch
(74) *Attorney, Agent, or Firm* — Knobbe, Martens, Olson & Bear, LLP

(57) ABSTRACT

A system and method are disclosed for providing wireless network access to a user of a remote device at a hotspot. In general, wireless communication is established by the system with the remote device to enable wireless transmission therefrom of social networking credentials associated with a social network profile maintained by a third party social network service provider. Using these credentials, the user is authenticated with the third party social network service provider, and, upon authentication, is provided wireless access to the network.

43 Claims, 12 Drawing Sheets

(56) References Cited

U.S. PATENT DOCUMENTS

| | | |
|---|---|---|
| 2005/0015432 A1 | 1/2005 | Cohen |
| 2005/0021781 A1* | 1/2005 | Sunder et al. .............. 709/229 |
| 2005/0216300 A1* | 9/2005 | Appelman et al. ............ 705/1 |
| 2005/0216550 A1* | 9/2005 | Paseman et al. ............ 709/202 |
| 2005/0239445 A1* | 10/2005 | Karaoguz et al. .......... 455/414.1 |
| 2006/0053296 A1 | 3/2006 | Busboom et al. |
| 2006/0265507 A1* | 11/2006 | Banga et al. ................ 709/228 |
| 2007/0006291 A1 | 1/2007 | Barari et al. |
| 2007/0113269 A1 | 5/2007 | Zhang |
| 2007/0124490 A1* | 5/2007 | Kalavade et al. ............ 709/230 |
| 2007/0150603 A1* | 6/2007 | Crull et al. ................ 709/227 |
| 2008/0031211 A1* | 2/2008 | Kalavade et al. ............ 370/338 |
| 2008/0039102 A1* | 2/2008 | Sewall et al. ............... 455/445 |
| 2008/0151847 A1* | 6/2008 | Abujbara .................... 370/338 |
| 2008/0186882 A1* | 8/2008 | Scherzer et al. ............. 370/310 |
| 2008/0195741 A1* | 8/2008 | Wynn et al. ................. 709/229 |
| 2009/0046677 A1* | 2/2009 | Toledano et al. ............ 370/338 |
| 2009/0064283 A1 | 3/2009 | Chen |
| 2009/0070412 A1* | 3/2009 | D'Angelo et al. ........... 709/203 |
| 2009/0157513 A1* | 6/2009 | Bonev et al. ................ 705/14 |
| 2009/0282144 A1* | 11/2009 | Sherrets et al. .............. 709/224 |
| 2009/0300722 A1* | 12/2009 | Haverinen et al. ............ 726/4 |
| 2010/0095359 A1* | 4/2010 | Gordon ....................... 726/6 |
| 2010/0107225 A1 | 4/2010 | Spencer et al. |
| 2010/0241652 A1* | 9/2010 | Fasihuddin et al. .......... 707/769 |
| 2010/0275267 A1* | 10/2010 | Walker et al. ............... 726/26 |
| 2010/0306099 A1* | 12/2010 | Hirson et al. ................ 705/38 |
| 2011/0034182 A1* | 2/2011 | Issa et al. ................. 455/456.3 |
| 2011/0137814 A1* | 6/2011 | Stewart ...................... 705/319 |

* cited by examiner

HOTSPOT NETWORK ACCESS SYSTEM AND METHOD

FIELD OF THE INVENTION

The present invention relates to wireless communication networks and, in particular, to a hotspot network access system and method.

BACKGROUND

Wireless devices and systems are currently available for enabling a user of a remote device access to a communication network (e.g. the Internet) via a wireless access point (WAP) and gateway communicatively linked to this communication network, for example, operated at a given location or in a given area commonly known as a hotspot. Current hotspot network access solutions generally do not allow for much flexibility and control in such access, and/or can be relatively cumbersome for end users and/or wireless network access providers (WNAP), wherein dedicated authentication credentials and profiling are required for each hotspot, or at least for each group of hotspots hosted and operated by a same hotspot network access provider.

For example, current authentication and authorization methods are generally implemented via a Web interface accessed by the remote device upon initial communication with an access point. Namely, a user can either login via a pre-registered account with the WNAP, create a new account, or again, be provided with free, albeit oftentimes limited access to the wireless network.

Technologically, operations of public hotspots are very similar and network access is typically provided via a common Web browser. Users generally connect in the following manner (1) the user enters the hotspot or "hot zone" which is serviced by wireless (e.g. Wi-Fi) coverage, starts a Wi-Fi enabled device, and uses it to scan the neighborhood for available wireless signals; (2) upon detecting a publicly available signal, the user will instruct a wireless connection manager software operating on the device to establish a radio connection with the detected network; (3) the user opens a Web browser and, in the event the hotspot is offered free of charge (e.g. wide open coverage), the user will gain full access to all Internet functions; otherwise, (4) the user will be redirected to an intercept page of the hotspot provider's design that provides instructions on how to connect, payment pricing and methods, and access to "free" sites and pages.

In this common system access implementation, users who have not yet logged in (e.g. pre-authentication) are severely restricted by standard firewall settings on the network access gateway which prohibit all Internet traffic attempts by these users. Access to certain Websites or resources which have been pre-approved by the WNAP may however be implemented via a firewall configuration commonly called a "whitelist" or "walled garden", which generally provides limited and controlled services to pre-authentication users. Once the user completes the necessary steps on the intercept page to purchase online time, his credentials are authenticated and he is connected to the Internet. At this point, an access list that permits all outgoing traffic to any destination is applied at the firewall and the typical hotspot user is authorized to access virtually any resource available on the Internet. Any restrictions on access are applied globally to all users and/or hotspots, and are usually motivated by reasons of security (e.g. to restrict hotspot users from gaining access to each other's systems) or propriety (e.g. restrict users in public settings access to certain questionable web resources).

These and other such hotspot network access methods may be cumbersome to the user, namely, as a new account often needs to be generated for every WAP, or for every group of WAPs implemented by different WNAPs. Thereafter, the user is then obliged to maintain a list of account information ready to access such services at different locations, which, depending on the type of information required for account identification, can be relatively demanding of the user, particularly ones maintaining a large number of accounts. For example, a user seeking WiFi access at a given coffee shop chain will have to create an account specific to this chain (i.e. new user name and password) which, in general, is only used occasionally and is therefore often discarded or forgotten by the user. Furthermore, a different coffee house chain is likely to require registration of a new account, as will a hotspot operating at the local airport, library, and hotel, resulting in an endless list of user account credentials. Alternatively, a user may gain WiFi access, at certain participating locations, via a given service provider account (e.g. home Internet account), in which case, relatively obscure and rarely used account details are not readily available to, or memorized by the user when needed.

On the other hand, even if free services are to be provided and one opted to avoid the cumbersome implementation of dedicated logins and credential verification procedures, little to no leverage would thus be provided to the WNAP or hotspot location (e.g. venue where network access is offered) in assuring the responsible usage of the services they provide to unregistered users. This may also be true, in fact, for services offered to new accounts generated at a dedicated hotspot, as user's may have limited interest in providing legitimate account information, which provides the hotpot operator with limited leverage at best.

Therefore, there is a need for a new hotspot network access system and method that overcomes some of the drawbacks of known systems, or at least, provides the public with a useful alternative.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the invention is to provide a hotspot network access system and method. In accordance with an aspect of the invention, there is provided a method for providing wireless network access to a user of a remote device at a hotspot, the method comprising the steps of: establishing wireless communication with the remote device at the hotspot to enable wireless transmission therefrom of social networking credentials associated with a social network profile maintained by a third party social network service provider; using said credentials, authenticating the user with said third party social network service provider; and providing the user wireless access to the communication network as a function of said authentication.

In accordance with another aspect of the invention, there is provided a system for providing wireless access to a user of a remote device at a hotspot, the system comprising: a network access module for establishing wireless communication with the device to enable wireless transmission therefrom of social networking credentials associated with a social network profile maintained by a third party social network service provider; and an access control module communicatively linked to said network access module for accommodating authentication of the user using said credentials with said third party social network service provider and providing wireless access thereto as a function of said authentication.

In accordance with another aspect of the invention, there is provided a computer-readable medium comprising statements and instructions for implementation by a computing system in authenticating a user of a remote device at a hotspot for providing wireless network access thereto, in accordance with the following: receiving as input social networking credentials associated with a social network profile maintained by a third party social network service provider; using said credentials, authenticating the user with said third party social network service provider; and providing the user wireless access to the communication network based on said authentication.

Other aims, objects, advantages and features of the invention will become more apparent upon reading of the following non-restrictive description of specific embodiments thereof, given by way of example only with reference to the accompanying drawings.

DETAILED DESCRIPTION OF THE INVENTION

Definitions

Figure 1:
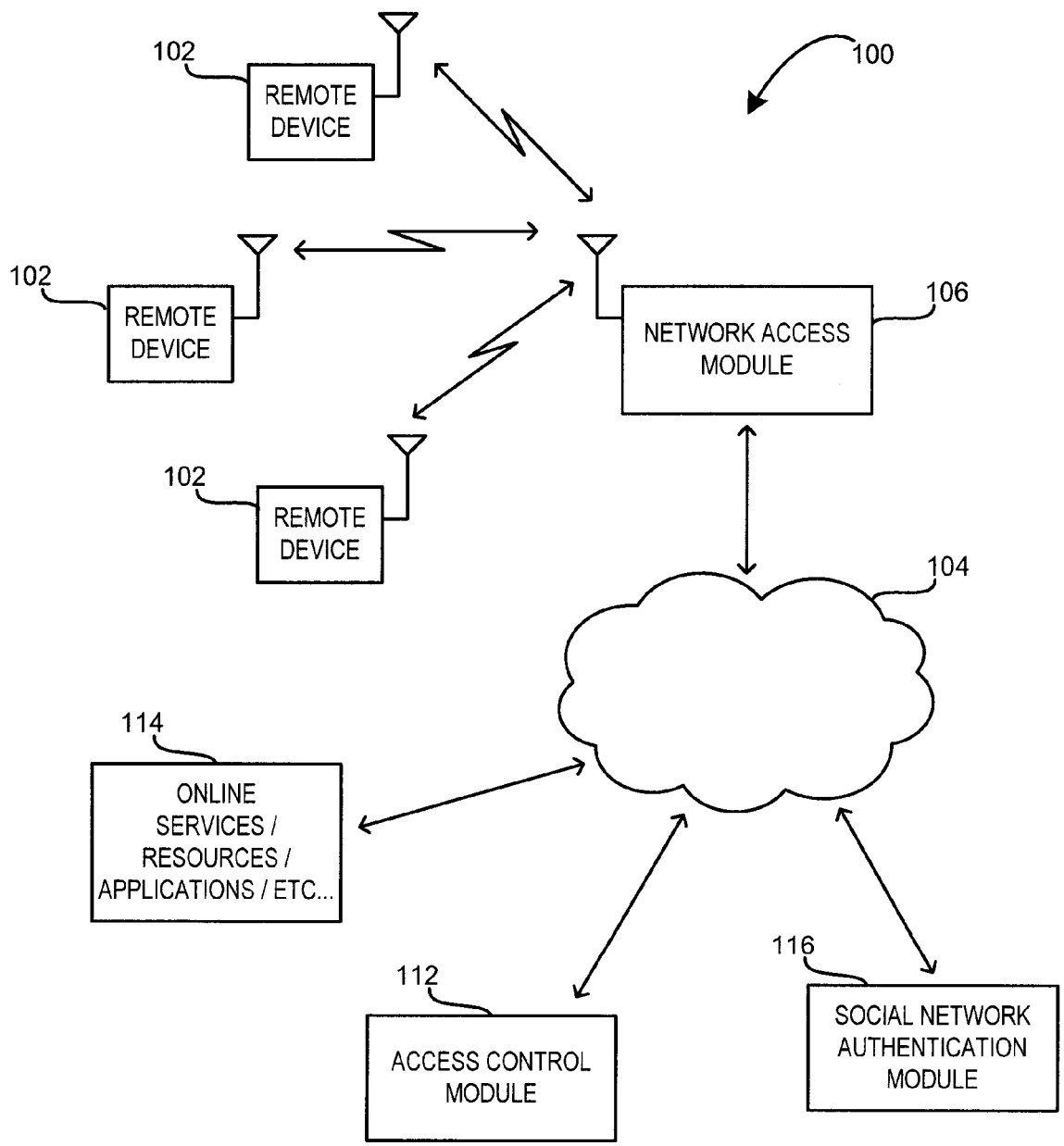
FIG. 1 is a high level diagrammatic representation of a hotspot network access system, in accordance with an embodiment of the invention.

The term "hotspot" is used herein to define a public access venue, location and/or geographical area in which a wireless access point (WAP) provides wireless network services (e.g. 802.11a/b/g/n based or supported services, WiMax based or supported services, and other such services) to mobile visitors through a wireless local area network (WLAN), metropolitan area network (MAN), wide area network (WAN), or the like, using, for example but not limited to, Wi-Fi technology or the like. Hotspot locations or venues can include, but are not limited to restaurants, train stations, airports, libraries, coffee shops, bookstores, fuel stations, department stores, supermarkets, universities, schools, and other such locations, as will be readily apparent to the person of ordinary skill in the art. Similarly, the term "hotspot-related data" is used herein to define data or information associated with a given hotspot or group of hotspots. Such data may be used in, for example and in accordance with different embodiments of the invention, but not limited to, monitoring network access usage by a user (e.g. in compiling network access statistics and/or reports identifying access usage, location, time, history, frequency and the like), tailoring network access privileges (e.g. access restrictions, authorizations, and the like) and/or content (e.g. information, news, promotions, advertising, opt-in services or programs associated with a hotspot location, area, venue, affiliation, operator, service profile and the like), and the like. In some embodiments, hotspot-related data may comprise different combinations of data related to a geographic position or area of the user, information pertaining to this position or area, and time of access, which may in some examples, have an impact on the validity or applicability of such data to the user for a given network access session.

The terms "social network" or "social network service" are used herein to define an online service allowing the sharing of personal profile/demographic information between registered users, groups and/or third parties, generally based on one or more levels of association defined between these users. For example, these services are generally focused on building online communities of individuals, professionals, partnerships and/or corporate entities, for example, who share interests, activities, occupations, professional accreditations, and the like, and who are interested in exploring the interests and activities of others, and/or making contacts with others who share these same or similar attributes. In some embodiments, the social network service is Web based and provides a variety of ways for users to interact, such as e-mail and instant messaging services, blogs, posts, discussion boards, and the like, for example. Some examples of social networking services may also allow for the categorization of user social profile information, which may include, for example, education (school, degrees, graduating years), personal and/or professional interests, consumer loyalties and/or product fan pages, contacts or friends (e.g. with links to at least a portion of their personal social profiles), one or more personal and/or professional recommendation systems (e.g. linked to trust or satisfied interactions), personal pictures, activity pages, billboards, discussion boards, etc. These and other such characteristics will be readily apparent to the person of skill in the art. Examples of social networking services may include, but are not limited to, Facebook, MySpace, Twitter, LinkedIn, Nexopia, Bebo, Hi5, Decayenne, Tagged, XING, Badoo, Skyrock, Orkut, Friendster, Mulitply, Wretch, Xiaonei and Cyworld, to name a few, as well as different networking services offered by traditional communication and/or Internet service providers such as Microsoft and Google, for example. In general, while other online services may allow for the communication, transfer and/or sharing of data to online users or subscribers, whose anonymity can generally be preserved either through free public access and/or the ability to create falsified or fictitious accounts, the social network will generally involve that a registered user prepare and publish, either publicly or privately to selected contacts or friends, a social network profile which identifies at least some legitimate information allowing others to recognise these users socially and interact with them based on one or more commonalities. Accordingly, the terms "social profile" and "social profile data" are generally used herein to define data or information associated with a given social network profile. As will be described in greater detail below in accordance with different embodiments of the invention, such data may, optionally, be accessed and/or used for user authentication, for instance in evaluating a legitimacy of a given social profile in authorizing network access. Such data may also or alternatively be used in tailoring network access privileges (e.g. access restrictions, authorizations, and the like) and/or content (e.g. information, news, promotions, advertising, opt-in services or programs). Furthermore, such data may also or alternatively be used in conjunction with other data, such as hotspot-related data, device-related data and/or user-related data in providing such access authorizations or tailoring.

The terms "device-specific data", "device-related data" and "device-identifying data" are generally used herein to define data or information optionally accessed and/or extracted from, or stored with respect to a given remote device, and accessible upon authentication or during network access, as appropriate or applicable given a particular implementation of the system described below, in accordance with different embodiments of the invention. Such data may be used alone, concurrently with social profile data, hotspot-related data and/or user-related data, or stored in one or more device profiles for concurrent of future association with such data, in tailoring network access privileges (e.g. access restrictions, authorizations, and the like) and/or content (e.g. information, news, promotions, advertising, opt-in services or programs). Such data may also or alternatively be used in monitoring network access usage by a user of the device (e.g. in compiling network access statistics and/or reports identifying access usage, location, time, history, frequency and the like).

The terms "user-specific data" and "user-related data" are generally used to define data optionally accessed from the user via the remote device, stored on and accessed directly from this device, or otherwise stored with respect to the user and accessed upon authentication or during network access, as appropriate or applicable given a particular implementation of the system described below, in accordance with different embodiments of the invention. In general, while overlap may exist between user-related data and social profile data, in the present context, user-related data is generally considered to include data accessed or retrieved independently from social profile data. For example, user-related data may include, but is not limited to, personal data volunteered by the user upon current or previous network access initiations, personal data related to a distinct user profile associated with an affiliated service provider or the like that is previously recorded, volunteered by the user upon network access and/or automatically accessed from such affiliated service providers, and/or personal data stored on the remote device and automatically accessed therefrom upon network access. It will be appreciated by the person of ordinary skill in the art that while a distinction is made here between user-related data and other types of data, different embodiments of the system described below may be considered herein where different types and combinations of data may be referred to commonly as defining a user profile, with respect to which data accessed from different sources are combined to provide a consolidated overview of user attributes in managing network access privileges, restrictions and/or tailoring a user experience.

It will be appreciated that the above definitions are meant to provide some guidance as to the intended use of these terms in the following description, but that such uses are in no way intended to be limited to the examples and meanings provided above, but rather, should be construed within the context of the below-described embodiments of the invention, and their alternatives, as would be understood by one of ordinary skill in the art. It will be further appreciated that while different embodiments may optionally access, store and/or seek to leverage, process, manipulate and/or use different types of data, as defined above, in implementing the hotspot network access systems and methods described below, the embodiments of the invention herein considered should not be construed to be limited to including such options.

Unless defined otherwise, all technical and scientific terms used herein have the same meaning as commonly understood by one of ordinary skill in the art to which this invention belongs.

With reference to FIG. 1, and in accordance with one embodiment of the invention, a hotspot network access system, generally referred to using the numeral 100, will now be described. The system 100 is generally configured to provide one or more remote devices 102 access to one or more online services, resources and/or applications 114 via a network 104, which may include wide open, restricted and/or tailored communicative access to this network. In the embodiment depicted in FIG. 1, the system generally comprises one or more network access modules 106, adapted for communicating wirelessly with the one or more remote devices 102, and one or more access control modules 112, communicatively linked to the network access module(s) 106 and configured to control wireless access to the network by the remote device(s) 102 via the network access module(s) 106.

In one embodiment, the access control module 112 and network access module 106 are configured to establish wireless communication with each device 102 to enable wireless transmission therefrom of social networking credentials associated with a user's social network profile maintained by a third party social network service provider (SNSP), and accommodate authentication of the user using said credentials with said third party SNSP, for example via social network authentication module 116, and provide wireless access to the user once authenticated.

In such embodiments, a user of a remote device equipped with a wireless communication device or interface, for example, may gain wireless access to a communication network, for example at a wireless hotspot or the like, using social networking credentials to be authenticated by a SNSP known to, trusted by or associated with the wireless network access provider (WNAP) operating at this particular hotspot. In contrast with traditional wireless networking authentication protocols, wherein a new user is requested to create a new account for each WNAP with which it wishes to operate, or again, wherein an existing user is required to maintain and remember a plurality of authentication and/or login credentials for one or more service providers, the user may readily access the wireless network provided at a hotspot, or other such location, using the convenience of commonly used social networking credentials. Accordingly, wireless access is facilitated and thereby further encouraged.

Figure 11:
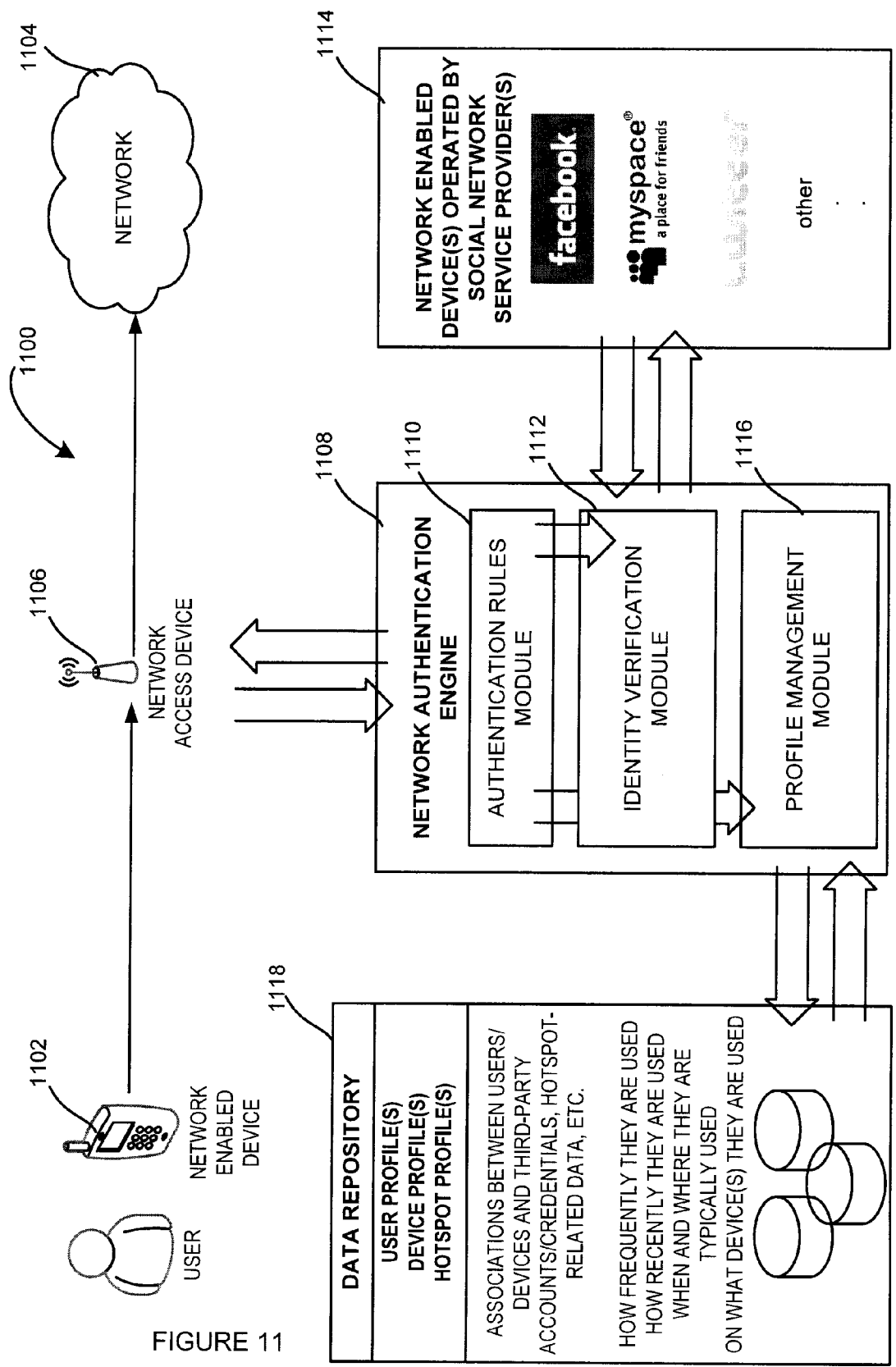
FIG. 11 is a diagrammatic representation of a hotspot network access system, depicting a network authentication engine associated with one or more network access devices of the system for managing user access authentication, in accordance with an exemplary embodiment of the invention.

As will be described in greater detail below with reference to the exemplary embodiments of FIGS. 3 to 7, the process of providing a user wireless access to a communication network, for example via a hotspot network access module or the like as shown in FIG. 1, and in accordance with one embodiment of the invention, can generally be divided into steps of identification, authentication and authorization. In general, identification refers to the process of accessing information from a remote device and/or user when there is a request from a network-capable device to access a hotspot network or the like. Once identified, the accessed information can be authenticated, namely verifying and/or certifying an identified set of criteria as true prior to allowing access. For example, in some embodiments, this authentication is based at least in part on the authentication of identified user social networking credentials, that is, to evaluate whether such credentials do in fact correspond or provide access to a social networking profile maintained by a third party social network service provider. Once authenticated, the user and/or device may be authorized access to the network, which may include wide open access, or restricted/limited access to selected actions, networks and/or services that the authenticated user and/or device is entitled to. For example, while access may be authorized or denied based on social networking credential authentication alone, access may also or alternatively be provided as a function of additional criteria, or again, different levels of access, or different access packages, may be provided based on an internal processing of said criteria, namely, in compliance with one or more predefined or programmed access authentication/authorization rules, as described in greater detail below with respect to different embodiments of the invention. For example, access or the level of access authorized for a given user may be based, at least in part, on the type of authentication credentials provided, particular attributes associated with their profile (e.g. various social profile data associated their social network profile, optionally bound with one or more of a network or affiliated user profile comprising user-related data, device profile comprising device-related data, partner service profile, etc.) and/or hotspot-related data such as hotspot provider, hotspot location, venue, or other affiliated service provider. It will be appreciated that different combinations of the above processes may be implemented by a common processing module and/or different intercommunicating modules (e.g. the access control module and network access module as depicted in FIGS. 1, 2B and 2C, and/or the authentication engine as depicted in FIG. 11), using different numbers of steps, or iterations, and having different levels of redundancy and/or parallel processing to provide a selected level of efficiency and/or accuracy.

For example, and in accordance with different embodiments of the invention, in order to delegate, at least in part, the authentication authority to a third party, such as a SNSP, particularly if multiple authentication options are to be provided concurrently, the WNAP provides a flexible and extensible authority delegation solution which allows users of these third party social networking services to be, in some embodiments, securely authenticated using these social profile credentials at WNAP powered hotspots, for example. Therefore, in accordance with some embodiments, the WNAP provides a network access system that enables the secure and user-friendly transmission of social networking credentials, either directly to a social network authentication module, or to the network access module and/or control module acting as a proxy to this authentication module. Upon successful authentication, the WNAP is thus advised of the user's authentication, and in some embodiments, provided access to at least some information (e.g. metadata or the like) about the user (e.g. access to at least a portion of the user's social network profile, or social profile data associated therewith). In general, the identification and authentication process is implemented within a walled garden space of the wireless hotspot, for example, to limit the user's access pre-authentication. For example, the user may be limited to a WNAP enabled login Website, a login interface provided by the social network (e.g. login-specific URLs, APIs), or the like. As will be appreciated by the person of ordinary skill in the art, depending on the selected third party service provider, different technical issues, security requirements and/or other such attributes may be managed by providing the user with dedicated authentication procedures/interfaces, or again, performing dedicated authentication procedures in the background from a common WNAP-enabled user interface.

For example, in some embodiments, a "plugin" option is created for each participating third party authenticator to address respective security, connectivity and/or other technical requirements imposed thereby. For instance, in one embodiment, a restricted Web-access authentication process may be initiated for a given SNSP, wherein a user navigates to the SNSP's restricted Website (e.g. SNSP.com, login.SNSP.com, *.connect.SNSP.com, etc.) and provides their credentials (e.g. via an authentication API), which are then authenticated by the SNSP, the results of which are communicated to the WNAP for further processing, for example, in the form of metadata or "security tokens". In one such example, the user is provided restricted access to a Web-enabled third party authentication API, for example via a restricted or wild-carded domain (e.g. *.connect.SNSP.com). In another embodiment, an internal API is exposed to the WNAP such that social networking credentials provided by the user through a WNAP-hosted portal can be authenticated by the WNAP using this API, and network access granted to the user based on said authentication, and optionally, further based on user-specific data (e.g. social profile data) accessed through this API.

Figure 3:
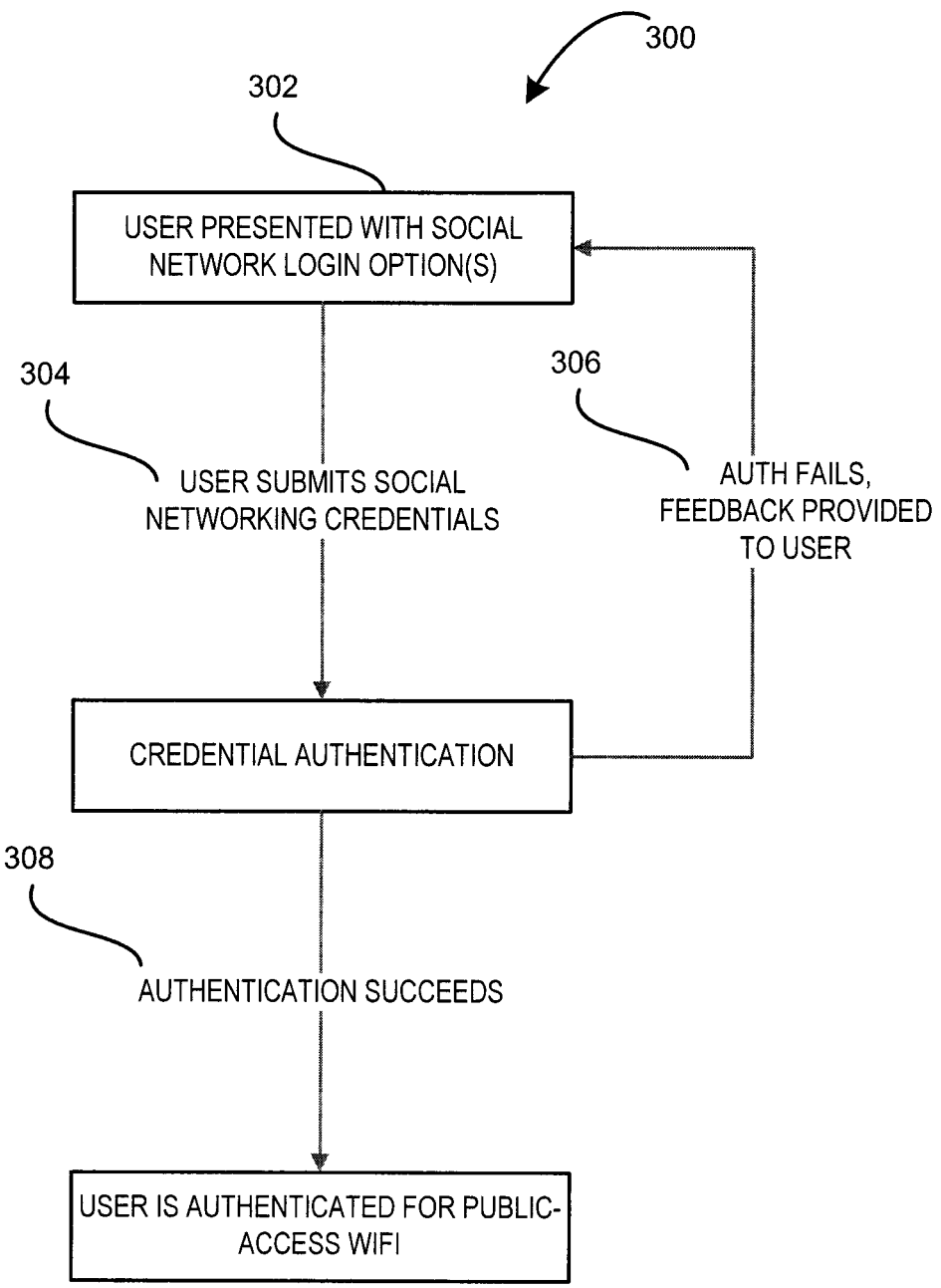
FIG. 3 is a high level flow diagram of broad steps implemented in a hotspot network access system, in accordance with an embodiment of the invention.

FIG. 3 provides an exemplary identification, authentication and authorization process flow 300, in accordance with an embodiment of the invention. In this embodiment, the user is presented with one or more network access options, at least one of which comprising a social network-based authentication option (302). Using this option, the user provides social networking credentials 304 that are transmitted through the network access module for authentication. For example, the user's credentials may be authenticated by an access control module that independently authenticates the user with the SNSP in question, or rather be authenticated directly by the SNSP, or an application implemented locally or remotely thereby and monitored by the WNAP. Other non-limiting authentication examples will be discussed below with reference to FIGS. 4 to 7. If authentication fails 306, feedback is provided to the user, who may try again with other credentials and/or via one or more alternative authentication options provided by the WNAP. If authentication succeeds 308, the authenticated user is authorized access to the network (e.g. public WiFi access).

As will be appreciated by the person of skill in the art, for the WNAP, the provision of social networking authentication can provide a greater level of authenticity to the user's access credentials, or again provide for a simplified authentication procedure, as compared to conventional methods. Namely, while a user could conventionally login to a wireless network using a series of illegitimate or falsified credentials, users may be far less likely to falsify their user profile maintained for use on a social network. For example, while a user may be inclined to generate fictitious information in registering for wireless access at a given hotspot, particularly for free access services wherein credit card or other payment methods need not be provided and therefore cannot be verified, this user's social networking profile, as maintained by a SNSP, is more likely to include at least some legitimate information on this user, such as their real name, age, address, citizenship, social affiliations, contacts, etc. Accordingly, by accepting to disclose their social networking credentials to a given WNAP, and thereby at least in some respect, or at least perceptively to the user, providing this WNAP with some legitimate personal information in exchange for wireless access, this user is less likely to abuse their access privileges.

Figure 4:
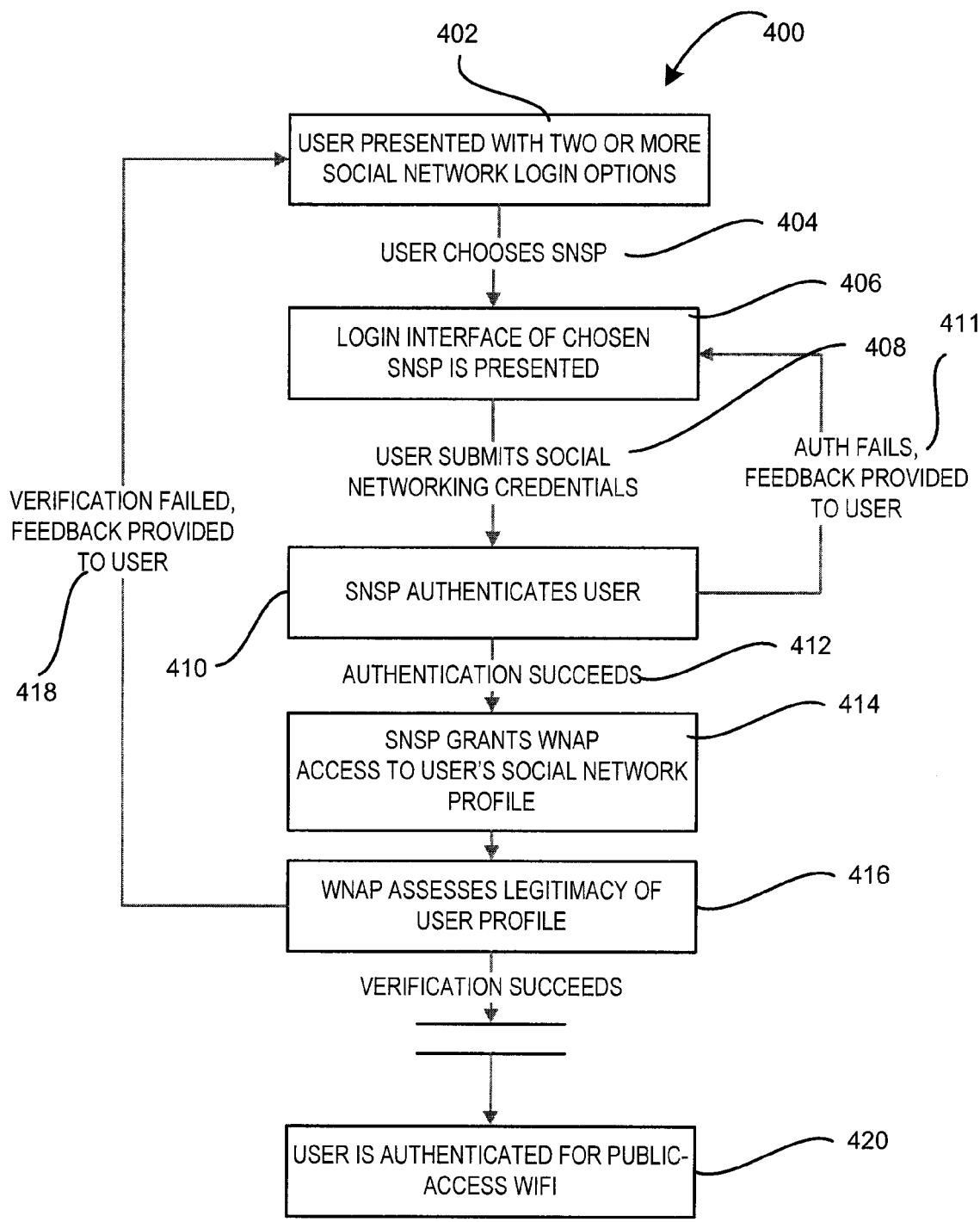
FIG. 4 is a flow diagram of exemplary steps implemented in a hotspot network access system, in accordance with an embodiment of the invention.

In one embodiment, the WNAP may further leverage access provided to a user's social networking profile via their social networking credentials, to further verify the legitimacy of the user's credentials, for instance, by evaluating at least some of the content of the user's social networking profile for consistency, reliability and/or legitimacy. For example, in one embodiment, as depicted in FIG. 4, an identification, authentication and authorization process 400 further comprises a verification of the user's social networking profile information, for example based on one or more network access authorization protocols/rules. In this embodiment, the user is presented with two or more social network-based authentication options 402, from which the user may select a preferred social networking authentication option 404 (or one with which the user is associated). In response to this selection, the user is presented with an appropriate login interface 406 associated with the selected social networking authentication method. In this embodiment, the login interface is provided directly by the SNSP for direct authentication thereby (for example, via a Facebook Connect application protocol interface (API) of the like). The user provides social networking credentials 408 that are transmitted through the network access module for authentication by the social networking authentication module at step 410. If authentication fails, in this embodiment, the user is provided with a failed authentication message 411 and they are left to retry or to attempt authentication via an alternative option. If authentication succeeds, in this embodiment, the WNAP is advised of the successful authentication 412. The user may also be advised of this successful authentication, but not necessarily so as, in this embodiment, the WNAP performs a supplementary verification prior to providing the user access to the network. Namely, in this embodiment, the WNAP is provided access by the SNSP to at least a portion of the user's social networking profile (step 414), i.e. at least a subset of the social profile data associated with the user's social networking credentials, from which the WNAP may assess a legitimacy, or at least a perceived legitimacy of the user's social profile at step 416. Upon failed verification, a failure message is sent to the user (418), otherwise, the user is provided authorized access to the network at step 420.

In embodiments as described above with reference to FIG. 4, and others similar thereto described below with reference to FIGS. 5 to 7, various verification protocols may be implemented to assess a legitimacy of the user's social networking profile, and therefore, of the credentials provided and associated therewith. For example, in one embodiment, the WNAP may only grant access to a user whose social profile consists of a minimum number of contacts, friends and/or colleagues. For example, in one embodiment, a large number of identified social network contacts may indicate that the user makes frequent or common use of their social network profile and therefore, are more likely to identify themselves legitimately through this network. Alternatively, a user having only one or two contacts may have generated this profile as a test or sample of the system, or again solely for the benefit of different promotions offered through social network authentication (e.g. anonymous and/or free wireless network access), which they may have done using falsified account information. Accordingly, a WNAP may select not to provide these users with authorized access to the network given that limited leverage may be gained from the social networking credentials provided for authentication. Other examples of profile verifications may include verification as to the legitimacy of the user's recorded home or work address (e.g. does the address point to a real location), phone number, email address or other such contact information. Other features such as the user's educational information, level of social profile completion (e.g. full profile or substantially empty profile, for example, as quantified by the SNSP), level of trust or recommendations associated with the social profile, and the like may, alone or in combination, be used to assess a legitimacy of the user's social profile.

For example, in one embodiment, the system is configured to process a legitimacy and/or authenticity of the user's social profile by processing social profile data associated with the user's social network profile credentials, accessed automatically from or transmitted by a network-enabled device implemented by the SNSP. For example, in one embodiment, the system comprises an authentication engine, for example as depicted in FIG. 11 and possibly embodied within or communicatively linked to the access control module of FIG. 1, configured to receive as input one or more social profile data elements associated with the user's social network profile (e.g. distinct from the social networking credentials), and process these social profile data elements against a programmed set of authentication rules to selectively authorize access to the network upon these social profile data elements satisfying one or more of the rules. For example, the accessed social profile data may be processed independently or jointly against these rules, resulting in an authenticity score to be associated with the social networking credentials provided for authentication, such that network access is only authorized upon this authenticity score exceeding a predefined threshold. In one embodiment, the authenticity score is computed based on one or more attributes of the user's social network profile (e.g. derived from the accessed social profile data elements) being verified as true, which may, for example, be verified internally against one or more preset attribute thresholds (e.g. a relative completeness of the social network profile, a number of contacts identified in the social network profile, a number of user recommendations identified in the social network profile, a number of user contributions identified in the social network profile and a trust value associated with the social network profile, to name a few), or again verified as true based on external verification thereof via one or more online resources communicatively accessible to the authentication engine (e.g. postal code database, company listings, residential address lookup, etc.).

In addition, or alternatively, the system may be configured to tailor (e.g. customize) network access privileges based on a level of legitimacy (e.g. different authenticity scores). For example, a relatively complete social profile may lead to full wide-open access, or again enhanced access (e.g. greater bandwidth, longer access time, etc.) whereas a relatively limited social profile, or a profile including data of questionable authenticity may rather lead to restricted access (e.g. access only to social networking application, pre-selected online services or Web content, short access time, etc.).

Furthermore, the WNAP may also or alternatively verify the user's social profile for particular attributes defined by the WNAP, or hotspot provider, as necessary for access authorization, or again, necessary for preferential or enhanced access privileges. For example, the access control module, or authentication engine may be configure to compare accessed social profile data with hotspot-related data, for example, to identify a potential relationship between the two, wherein such identified relationship may be required for network access, or lead to enhanced or tailored privileges. For example, a hotspot provided at a national coffee chain may provide free wireless access to regular patrons who identify their loyalty to this coffee chain as part of their social profile. For example, a Facebook user may include a "fan page" to this coffee chain, thereby providing them access to free network access when attending one of their locations based on this social profile attribute. In this example, the authentication engine could be configured to identify the relationship between the user's social profile data, which includes reference to the coffee chain, and the relevant hotspot-related data (coffee chain operated hotspot, coffee chain affiliated with hotspot operator, etc.). Alternatively, should such relationship not be identified, a user attempting to gain network access at such a given hotspot may be provided with the opportunity, either pre- or post-authentication to generate such relationship, for example, in order to obtain enhanced access privileges, or again, as a means to gain access to instantaneous promotions. To follow from the above example, an authenticated user for whom there currently exists no relationship between their social profile and the coffee chain, could be invited to include reference to the coffee chain in their profile (e.g. status update on there profile identifying themselves as being currently located at a given coffee house, generation of a coffee chain "fan page", etc.) in exchange for enhanced access privileges, or again, a one-time purchase offer (e.g. electronic coupon, etc.).

Other examples may include providing user's access only upon identification in their social profile of a standard or temporary key phrase or attribute, for example promoted openly by the WNAP, hotspot provider, or affiliated service provider as a promotional tool to encourage social exchange on this topic and thereby generate interest in the hotspot provider's products or services. Other examples may include promotional services offered to certain target demographics (e.g. age groups) or the like. Furthermore, verification of a user's social profile information may be implemented to customize the level of access services provided to the user, for example, based on demographics or the like. Other examples of customized (e.g. tailored) service allocations will be describe in greater detail below.

As a further example, and in accordance with an embodiment of the invention, a user whose social networking profile identifies them as having particular interests may be directed to a network access landing page related to this particular interest, or again, be offered one or more online or redeemable promotional packages based on this preference. In another example where the user's social networking profile identifies patronage to a particular establishment or venue, and where the user is currently accessing the network from a hotspot at this particular establishment, or again from a hotspot associated therewith, a promotional offer may be presented to this user to encourage such patronage as a type of reward for their free advertisement of such patronage on their social network (e.g. in addition to free network access). In the coffee chain example presented above, where a user posts a particular preference for the products offered by this given coffee house chain on their social networking profile, when the user uses the credentials associated with this particular profile at a hotspot hosted at a location from this coffee house chain, they may be provided with a free coffee offer, thereby not only encouraging promotion of their products on the social networking platform, but also promoting use of their wireless networking services and purchase of their products while doing so. As will be appreciated by the person of skill in the art, other attributes identified by the WNAP from the user's social profile and/or access location (e.g. hotspot-related data) may further or alternatively be used to accommodate service customization and/or targeting. For example, the user's age, gender, current geographical location, time of day, origin, social background, education, etc. may all or individually be used to further customize or tailor the user's experience.

It will be appreciated by the person of skill in the art that various targeted content, advertising and/or promotional materials may be provided through this authentication method that would not otherwise be accessible to the hotspot operator, WNAP, SNSP, and other parties and/or partners that may be involved in the development and implementation of the these programs. As a further example, the WNAP may compile the information accessed through social network authentication (e.g. social profile data, optionally cross-referenced with hotspot-related data as well as device-related data and user-related data volunteered by the user and/or automatically accessed from their remote device or transmissions received/intercepted therefrom, as discussed below) to generate various reports on the particular demographics of their users, interests, preferences, and the like. For example, these reports may then allow a WNAP, hotspot operator, or others involved access to consolidated information to better focus various advertising or promotional campaigns. For example, a landing page at a given hotspot may be customized based on the general demographics of the users they attract, or again, provide differently customized landing pages to different users falling within different demographic categories as compiled by the WNAP's user access reports. In another example, a brief advertisement selected based on the user's social profile and/or demographics may be shown to the user before they are granted access, or again, while the authorization and initial access negotiations are taking place. Another example may include, but is not limited to, ads and/or promos embedded on a session page or the like, i.e. a window showing remaining available session time, etc. Also, as described in greater detail below, different access privileges (e.g. access time, speed, breadth of accessible sites/services, etc.) may also be customized based on a number of business rules and/or profile evaluation algorithms implemented with respect to the user's social (or related) profile information. These and other such examples should become more apparent to the person of skill in the art upon reference to the following examples and are therefore not considered to depart from the general scope and nature of the present disclosure.

Figure 5:
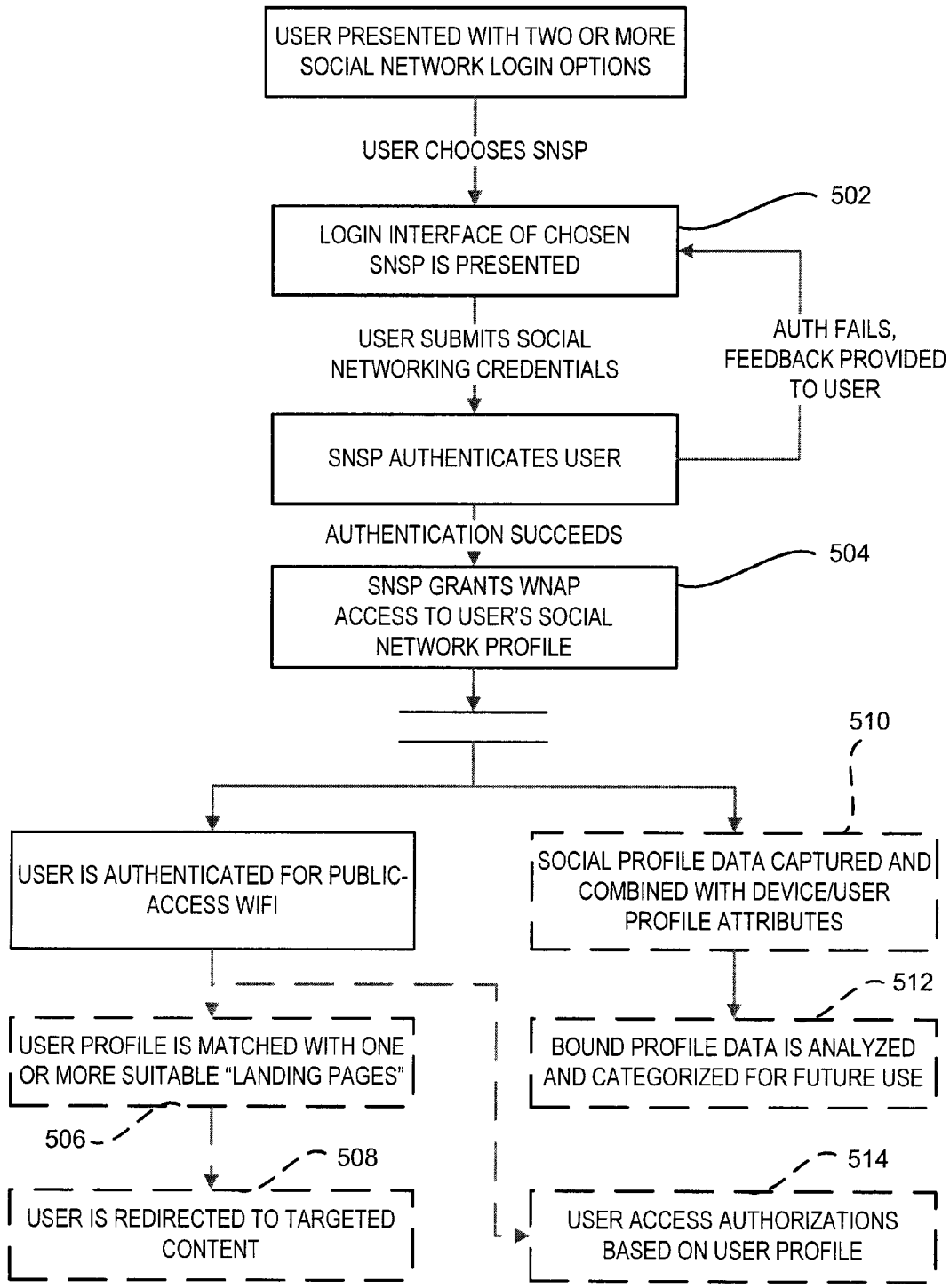
FIG. 5 is a flow diagram of exemplary steps implemented in a hotspot network access system, in accordance with another embodiment of the invention.
Figure 6:
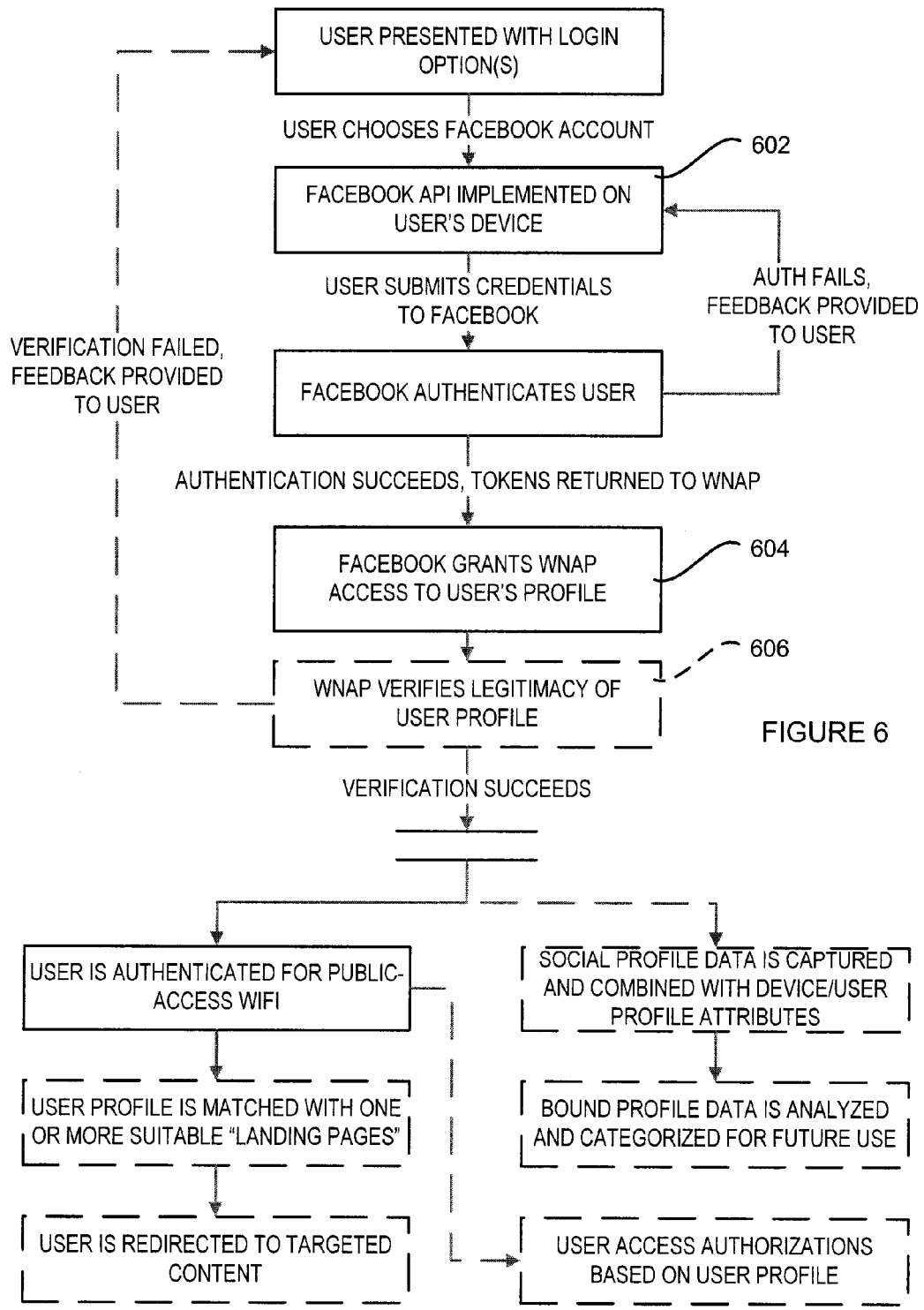
FIG. 6 is a flow diagram of exemplary steps implemented in a hotspot network access system, in accordance with another embodiment of the invention.
Figure 7:
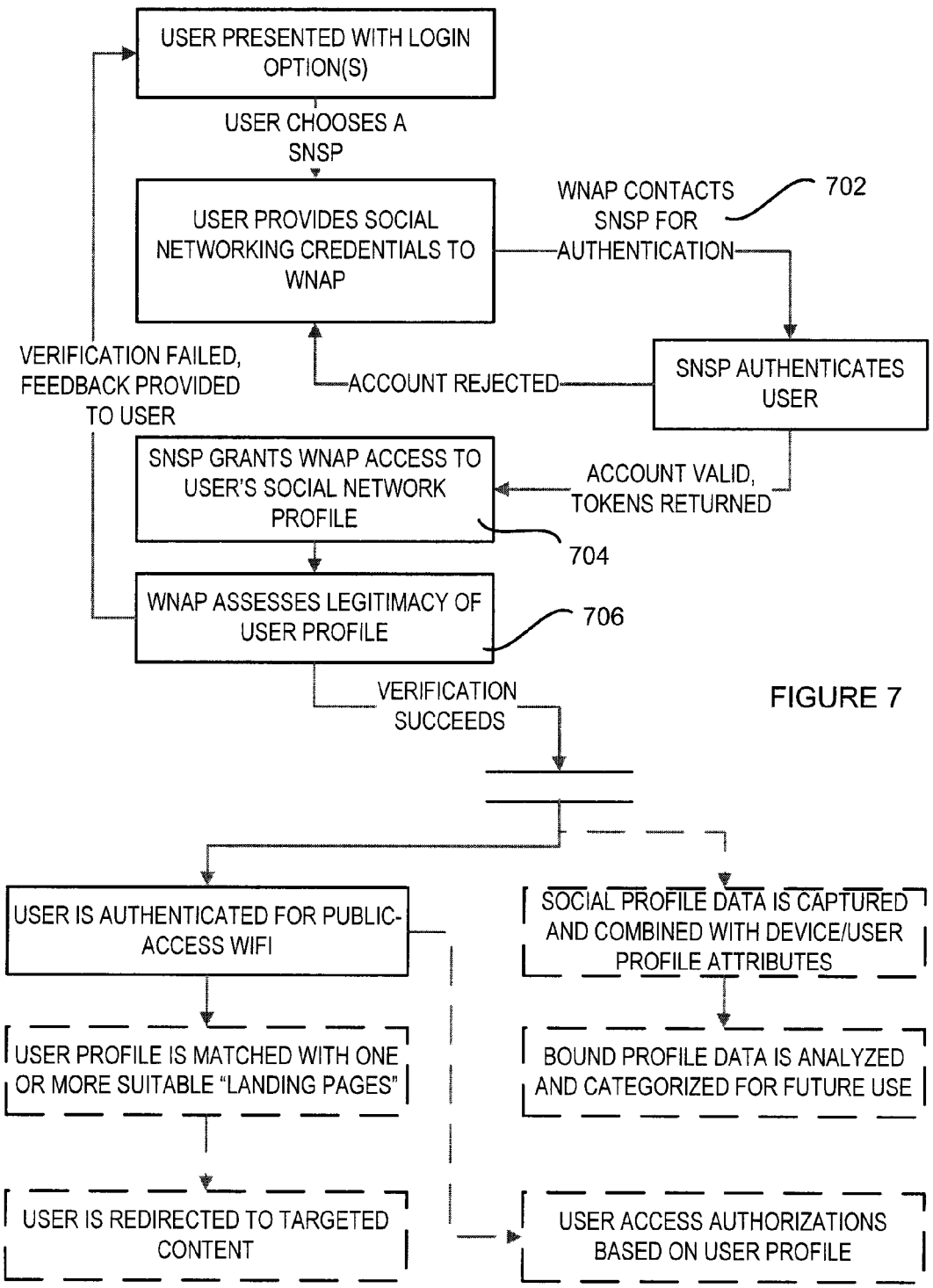
FIG. 7 is a flow diagram of exemplary steps implemented in a hotspot network access system, in accordance with another embodiment of the invention.

FIGS. 5 to 7 provide different examples of user identification, authentication and authorization processes implemented in accordance with different embodiments of the invention, and that implement, in different combinations, some of the attributes described above. Optional social, user and/or device data processing options, for implementation during or post authentication, are also shown in dashed boxes, in accordance with different exemplary embodiments of the invention. For example, in FIG. 5, the user's social networking credentials are identified and authenticated via a SNSP-specific interface (step 502), for example as described above with reference to FIG. 4. In the embodiment of FIG. 5, however, while access to at least a portion of the user's social network profile is provided by the SNSP to the WNAP (step 504), the information accessed thereby is not used in the authentication process through an optional social profile verification process, but is still optionally used to match the user with one or more suitable landing pages (optional step 506) for redirection to targeted content (optional step 508). Alternatively, or in addition, the accessed social network profile information may be stored by the WNAP and associated with additional user and/or device profiles thereby generating bound user profiles (optional step 510), described in greater detail below, from which combined profile data may be compiled, analyzed and/or categorized for immediate and/or later use (optional step 512) in providing the user targeted and/or customized services, and other such services as will be described in greater detail below. Alternatively, or in combination, the social profile data may be analyzed on its own merits to define one or more network access authorizations (optional step 514) for the authenticated user (e.g. network access time, speed, accessible resources or types of services/applications, etc.).

In the example of FIG. 6, the user's social networking credentials are associated with a Facebook social profile and are identified and authenticated via a Facebook-specific interface, for example a Facebook API implemented directly on the user's remote device (step 602), such as the Facebook Connect API, for example. In this embodiment, in exchange for enabling social network authentication, the WNAP is provided access to at least a portion of the user's Facebook profile (e.g. Facebook Connect may provide the WNAP access to the user's personal name and photos, data about the user's friends, etc.)—step 604. As in FIG. 4, the WNAP may use the information accessed from the user's profile to verify a legitimacy thereof, for example (optional step 606). In addition, the accessed information may be used, for example, to redirect the user to targeted content, customize the user's access privileges, and/or to bind this information with other user and/or device profiles for future or immediate use (e.g. targeted/tailored content, customized access privileges, reporting to partner accounts, bound profile access credentials, etc.).

In another embodiment, as depicted in FIG. 7, the authentication process is implemented directly by the WNAP (step 702), rather than via a SNSP-specific API implemented directly on the user's device for direct communication with the SNSP's authentication module, for example as depicted in the Facebook example of FIG. 6. For example, in this embodiment, the user is provided with a WNAP interface through which social networking credentials are provided. These credentials are then authenticated by the WNAP with the SNSP directly. Upon successful authentication, the SNSP provides the WNAP access to at least a portion of the user's social network profile (step 704), which then proceeds to verify a legitimacy thereof (step 706) based on one or more verification protocols and/or rules. The accessed social network information can again be used for various targeted/tailored services and/or profile analyses.

As introduced above, and in accordance with some embodiments, the system may be configured not only to implement social network-based authentication, but also provide one or more profile binding options as well. In one embodiment, the user may be provided with the option to bind account credentials between different accounts and/or user profiles. For example, a particular user seeking to gain authenticated access to wireless services through social network-based authentication, may wish to identify themselves as a user of other communication services, for example, a cellular telephone account, home interne account, cable or digital cable account, satellite provider account, etc. For instance, if a user is provided access to certain services as a customer of a given service provider, and if this service provider, through partnership with the WNAP, for example, allows identified users accessing the network from this WNAP access to special privileges, this user may wish to bind their account with their social networking credentials, at least with respect to the WNAP, such that upon transmitting their social networking credentials to the WNAP, they are automatically authenticated through their partner account. Providing a series of bound credentials can then provide the user with the facilitated access to all entitled access privileges using single access credentials, which, in most respects, are more commonly used and therefore easier to remember and use. Clearly, credential binding can provide the WNAP with greater access security and legitimacy, as well as access to a greater amount of user-specific materials for targeted use and tailoring the user's networking experience.

In another example, profile binding may be implemented automatically, for example, through automatic device identification and profile recognition. Namely, as will be discussed in greater detail below, the network access module and access control module may be configured to automatically extract device-related data from data transmissions received from the device, which device-identifying data may have previously been detected or registered with respect to the user's other credentials or profile. Accordingly, upon automatic device identification and recognition as a device previously associated with a partner account profile, for example, the social networking credentials may be automatically bound with this partner account profile for immediate or future authentication, reporting with respect to the partner account, targeted access or customized access privileges, and the like. Similarly, access privileges and/or content may be tailored as a function of device recognition, that is, so to enhance or modify the user's networking experience not only in a manner most appropriate for the remote device in use, but also optionally as a function of the device type or brand. Namely, promotional and/or targeted content may be selected as a function of the user's remote device, for instance, or again, enhanced or preferential services may be offered to user's of remote devices sold or supported by particular service providers associated and/or affiliated with a given hotspot operator or WNAP.

Figure 8:
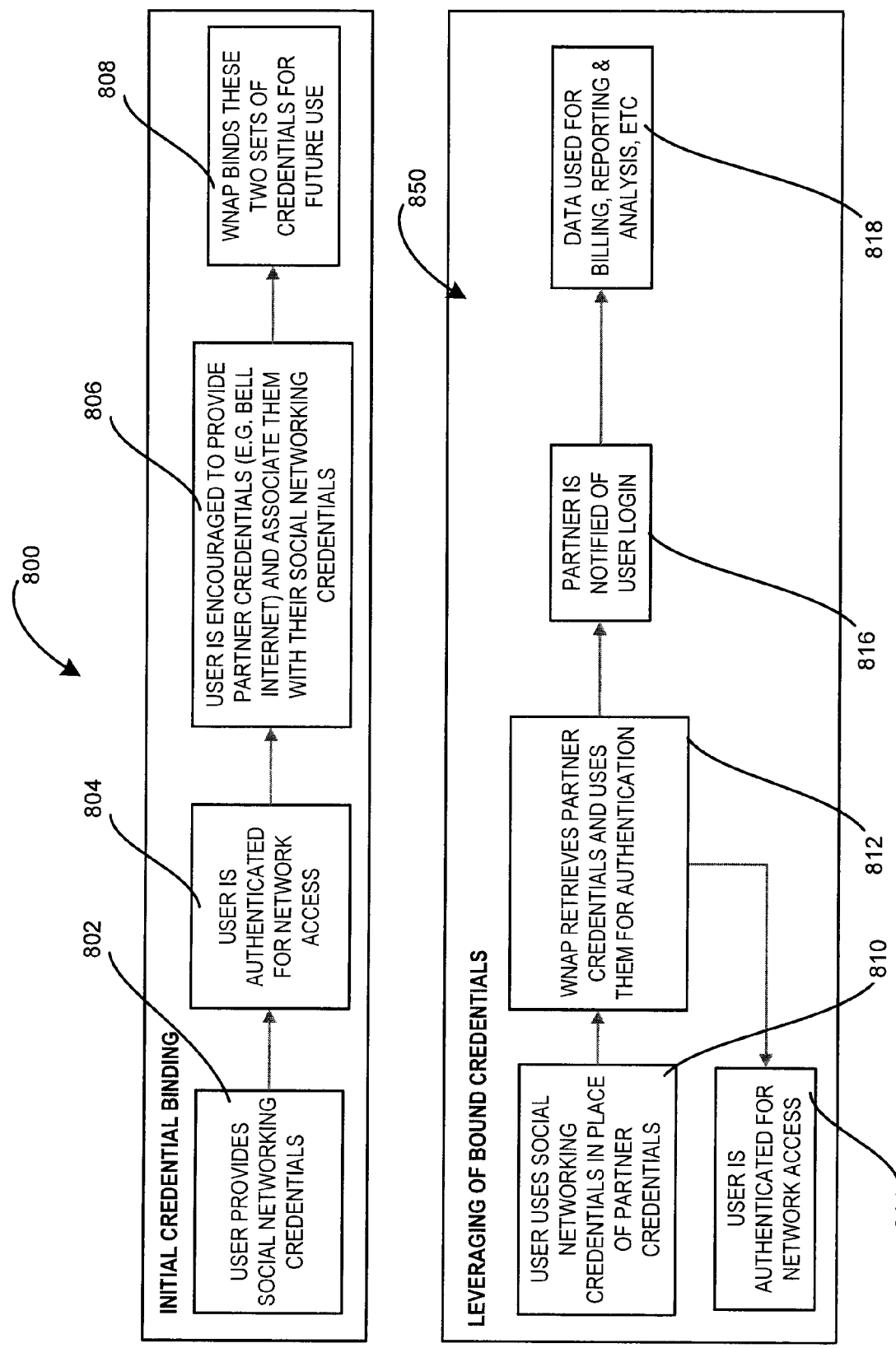
FIG. 8 is a diagrammatic representation of credential binding and leveraging, in accordance with one embodiment of the invention.

FIG. 8 provides an exemplary implementation of credential binding, generally referenced by the numeral 800, and bound credential leveraging, generally referenced by the numeral 850. In this example, a user first accesses the system using social networking credentials (e.g. Facebook credentials) at step 802. The user is then authenticated for network access at step 804 using these credentials, and optionally based on one or more social network profile verification protocols/rules (e.g. programmed authentication rules). In authorizing the user access to the network, the WNAP may then invite or encourage the user to provide additional information that identifies them as patrons to another service provider (e.g. a partner to the WNAP or another service division of the WNAP, such as a home Internet or cellular network access provider) at step 806. The user may be enticed to furnish these additional credentials, for example, in order to gain further access privileges, special prices or discounts, promotional offers, or the like, or again, to increase their network accessibility by having different wireless access venues, providing access based on different service credentials, be accessible using the same social networking credentials, for example. As discussed above, such additional service credentials/information may also be accessed automatically, optionally unbeknownst to the user, via automatic device identification/recognition, for example. Upon providing these additional credentials, the WNAP may then bind the social networking credentials with these additional credentials in a combined user or network access profile (step 808), possibly in further combination with further user information extracted from the user's social networking profile.

Once bound, the WNAP may then leverage bound credentials by allowing a user to identify themselves using social networking credentials at step 810, in response to which, the WNAP may retrieve partner credentials bound thereto at step 812, for example to provide alternative, complimentary or redundant authentication for authenticated access at step 814. In addition, the WNAP may notify its partner of the user login at step 816, who can use this data for billing, reporting, analysis and the like at step 818. Furthermore, the user, upon next attempting to gain network access from a partner location, may be provided the option to login using their social networking credentials. These and other such examples should become apparent to the person of ordinary skill in the art.

In yet another embodiment, and as introduced above, the system may further be configured to combine social network based authentication with remote device authentication, the latter of which is described in detail in Applicant's international patent application publication no. WO 2008/148191, the entire contents of which are incorporated herein by reference. For example, while the user may select to use their social networking credentials to gain authenticated access to the communication network at a given hotspot, the network access module and social network authentication module may be configured to also recognize device-specific data communicated automatically by the device.

For example, with reference to FIG. 1, the network access module 106 may be configured for receiving identifying data from a remote device 102, and for communicating this identifying data to the access control module (or service access module) 112 for further authentication, authorization and/or service customization. For example, while a user's social network authentication may allow for a certain level of access to the network, binding of this user's social credentials with this user's device-specific credentials, for example as pre-registered with the WNAP or one of its partners, or again as automatically identified and recognized by the WNAP from prior sessions, can allow for enhanced or customized access privileges, or again, more targeted or tailored access based on the user's known preferences, demographics and/or device characteristics. Not unlike service credential binding with other service providers, as discussed above, device credential binding may lead to a more targeted service which can be beneficial to the user, as well as the WNAP and their partners.

In one embodiment, for example, once the device-identifying data is authenticated, the control module 112 may provide the remote device 102 full access to the network, using the device credentials mainly as complimentary to the social networking credentials, or again provide restricted access to selected services based on user information, device owner or type information, and/or a combination thereof, for example. In another example, the device-specific information is not authenticated by a device profile, but is still used by the WNAP to customize the access services to the user based on the type of device used and its capabilities, as discussed below. Device-identifying data may, for example, comprise device type data automatically embedded within device transmissions and extracted by the system, device type data extracted from user preferences available from the device, user data inputs (e.g. username and password, etc.), or a combination thereof, to name a few.

In one embodiment, information retrieved from the device may include such information as, but not limited to, user name, user password, account number, remote device type, MAC address, browser information, remote device configuration, clock or crystal oscillator information, serial numbers, and the like, and can be stored an used in the formulation of a device profile or advanced device profile to be associated with the user's other credentials (i.e. social networking credentials, user credentials, associated account information, etc.). The device profile can be used, for example, to identify, track, manage, and report on remote devices by remote device type, remote device model, or specific instances of a remote device, as well as tailor the user experience based on the attributes retrieved from the user's own device (i.e. device-specific formatting, targeted advertising, customized landing page, device or brand-specific promotions, etc.). Namely, network access can be configured, at least in part, based on the device profile to allow tailored network access privileges and/or content.

In some embodiments, remote device information, for example as can be used to create or verify against a device profile, is captured during negotiation of a connection between the remote device and the network access module. For example, in one embodiment, a remote device may send a request to initiate a wireless connection with the network access module through an application such as a web browser. Depending on the remote device or remote device type, the request can contain different information, or be configured in different ways as would be understood by a worker skilled in the art. For example, a connection request can include specifically configured fields in HTTP headers, configurations of portions of a query string in a URL, MAC address, or other configurable aspects of the connection request as would be understood by a worker skilled in the art. This configuration information can be indicative of the remote device or remote device type, since connection requests by different remote devices or device types can be configured differently. For example, different types of connections can be requested in different ways by different remote devices such as laptops, PDAs, gaming devices, or the like. The information related to the connection request can be forwarded by the network access module to the control module, the control module configured to extract and analyze the information to obtain further information about the remote device or remote device type, for example by comparing the configuration of connection request information against one or more device profiles which relate predetermined profiles or configurations of information to one or more remote devices or remote device types typically having said profile. The further information obtained from this analysis can subsequently be used as further authentication of the user, for example in combination with social networking credentials, or again to further populate a combined network access profile associated with these credentials in further customizing and/or tracking network usage by this user.

Furthermore, as an alternative to or in addition to configuration information obtained during the initial request as described above, information about the remote device can be obtained by running a script or query (e.g. a JavaScript or mobile software agent) on the remote device. For example, in response to a connection request by the remote device, the control module can transmit a script to the remote device (via the network access module), or remotely trigger execution of a script already on the remote device. The script can be configured to extract and communicate identifying data to the control module (again via the network access module). For example, a script could obtain and transmit configuration information about the web browser application, application version, host operating system, host hardware platform, language, screen size, and the like. This configuration information can be stored and accessed in ways known to a worker skilled in the art and can be indicative of the remote device or remote device type, since different remote devices can be configured differently. For example, different remote devices such as laptops, PDAs, gaming devices, or the like are typically configured differently with different hardware and software. In addition, some configuration information may not exist on some remote devices, resulting in an error when such configuration information is searched for. These errors can also be indicative of the remote device or remote device type, since it can be used to explicitly eliminate possible remote device configurations which would not typically have resulted in such errors. The information obtained and communicated by the query or script can be analyzed by the control module to obtain information about the remote device or remote device type, optionally in conjunction with other information, for example by comparing the information against one or more device profiles which relate predetermined profiles or configurations of information to one or more remote devices or remote device types typically having said profile. The information obtained from this analysis can subsequently be used to supplement authentication/authorization procedures, or again to further customize the user experience based on device configurations, device type or brand, etc. It will be appreciated that other means for accessing device-specific information from the device, such as accessed in response to a request or query implemented via a program, software agent, or mobile software agent such as a Java aglet transmitted to and/or initiated on the remote device during identification, which, during execution, gathers and transmits user and/or remote device information to the network access module and/or control module, can be considered herein without departing from the general scope and nature of the present disclosure.

Figure 9:
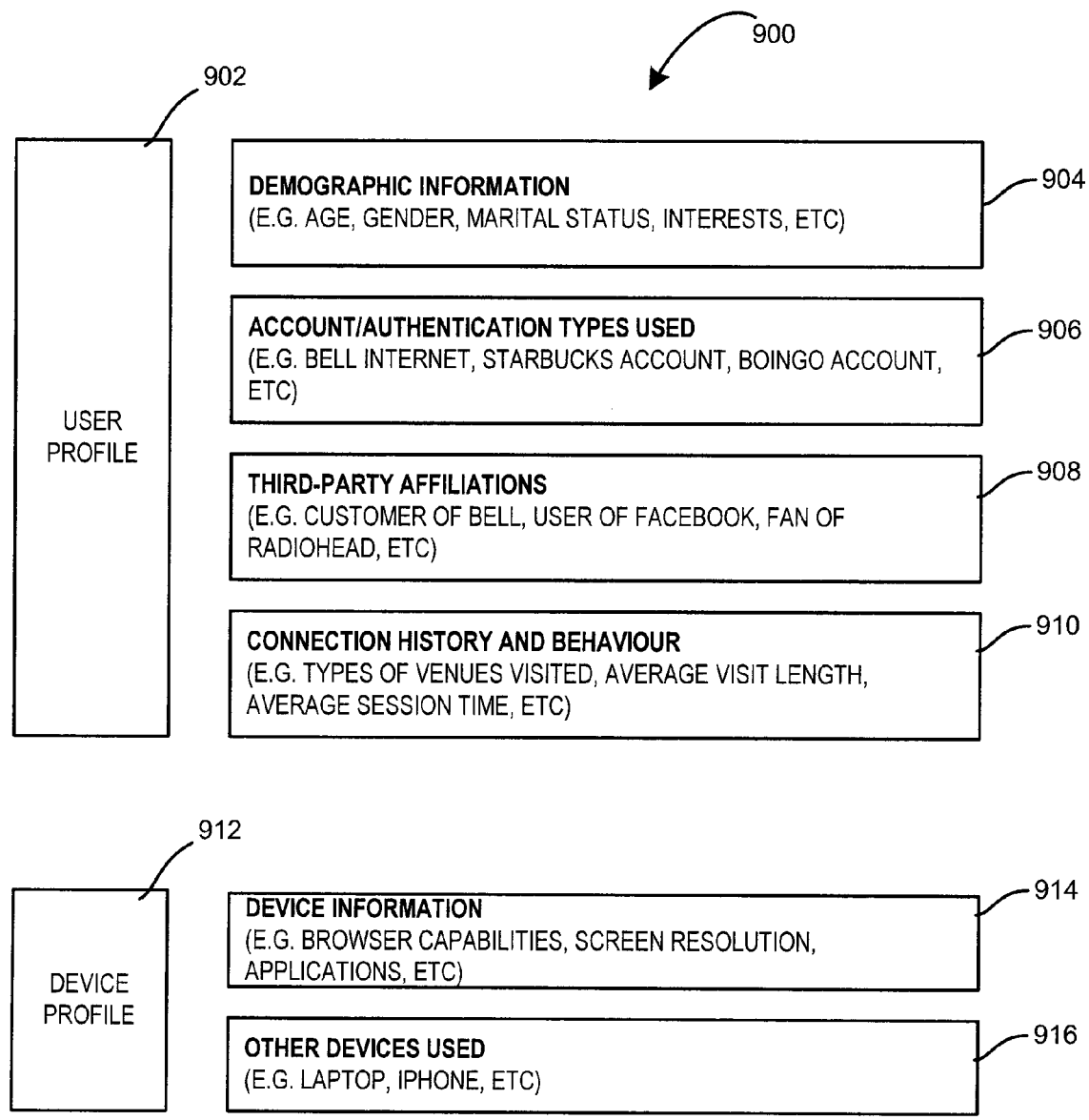
FIG. 9 is a diagrammatic representation of an exemplary network access profile comprising a user profile component and a device profile component associated therewith, in accordance with one embodiment of the invention.

FIG. 9 provides an example of the type of information that can be associated with a given user, for example when binding different profile types and/or sources with social network access credentials, such that, upon identification of these credentials, the system may provide the user thereof access to the network not only based on their social network status, but also based on one or more of the information fields populated in the user's bound profile. In the example of FIG. 9, a given profile 900 may include a user profile 902 comprising different combinations of, but not limited to, demographic information 904, account/authentication types used 906 (e.g. partner accounts bound with particular social networking credentials), third-party affiliations 908, connection history and behavior 910 and the like. This user profile may further be associated with a device profile 912, that may comprise, but is not limited to, current device information 914 (e.g. attributes of the device currently being used for access) and/or other devices used 916 (e.g. a listing of other devices registered and whose credentials are bound to this profile, and their attributes, etc.).

In another embodiment, where a device profile does not exist for the current session, the system may nonetheless access device-specific information to customize the user's experience. For example, if a particular device type is identified, the system may customize the user's access based on this device type, for example to provide a better networking experience to the user based on the computational and interfacing capabilities of their device. In another example, device type or brand recognition may be profiled based on an association or partnership with the WNPA. For instance, users of a particular brand of laptop computer may be provided with targeted advertising or promotional materials, or provided with customized privileges based on their loyalty to this brand. The person of skill in the art will appreciate that further examples of device-specific information leveraging may be considered herein without departing from the general scope and nature of the present disclosure.

Figure 10:
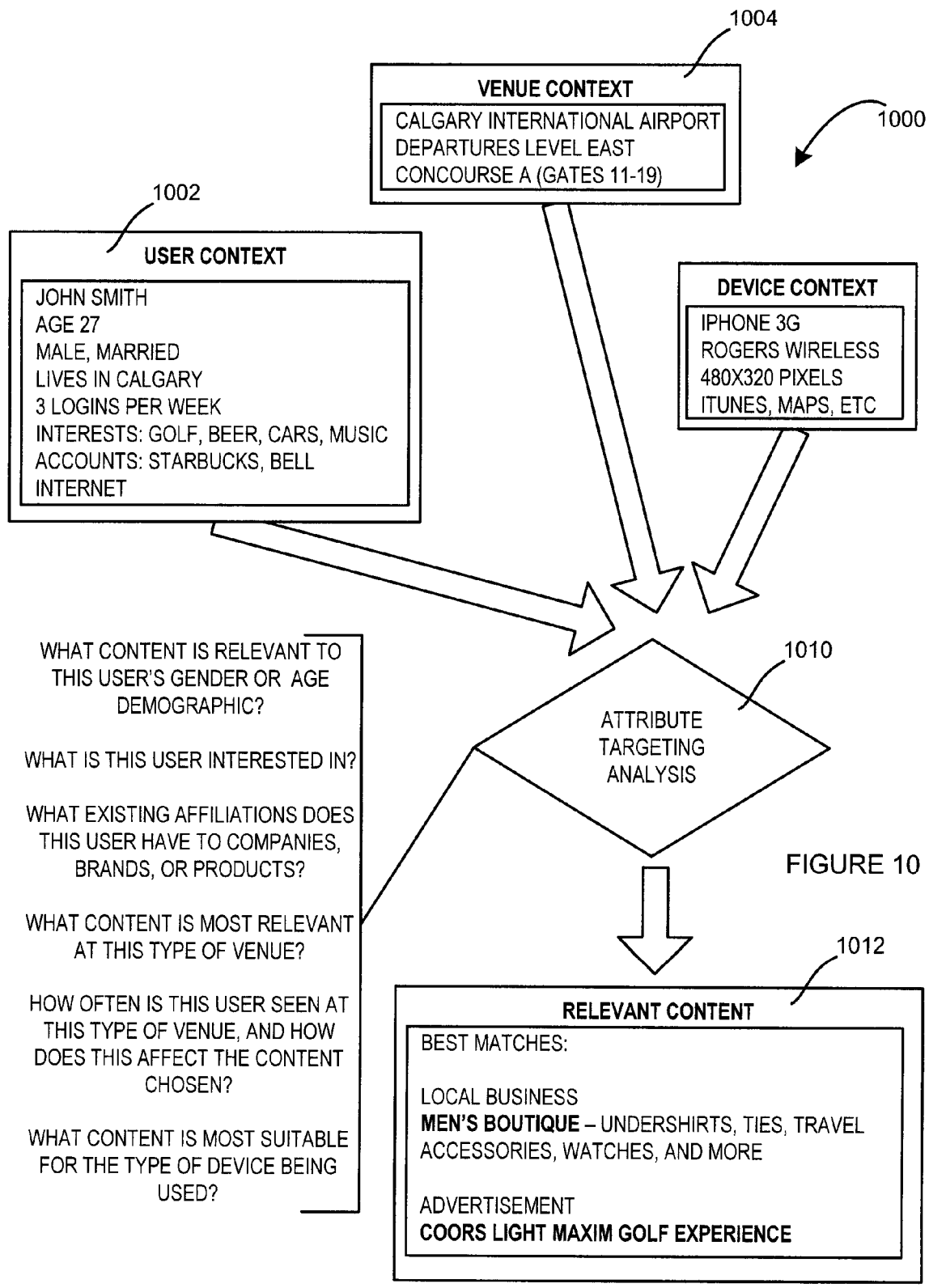
FIG. 10 is a diagrammatic representation of user attribute targeting, in accordance with one embodiment of the invention.

FIG. 10 provides an example of an attribute targeting process that may be implemented by the access control module based on one or more attributes associated with a given set of social networking credentials. In this example, an attribute targeting process 1000 may be implemented as a function of one or more of user attributes 1002 (e.g. defined, stored and/or accessed in a single social or bound user profile), venue or hotspot-related attributes 1004 (e.g. defined, stored and/or accessed in a venue or location profile) and/or device attributes 1006 (defined, stored and/or accessed in a device profile), for example. It will be appreciated that different combinations of the above profiles may be previously or partially stored with the WNAP, or accessed during a given session based on user input data (e.g. input user credentials, information, location, device, etc.), stored data previously or concurrently associated with the user social networking credentials, and/or automatically accessed data (e.g. authorized access to user's social networking profile, location data retrieved from the network access module or from the user's GPS enabled device, device data extracted from device transmissions, etc.). User attributes may include, but are not limited to, the user's name, age, sex, marital status, address (e.g. residence, city, region, state or province, country, etc.), network access frequency, personal interests, affiliated accounts, etc; venue attributes may include, but are not limited to, a specific region, city or location, or even a specific area within an identified location, and different services available at or around this location, to name a few; device attributes may include, but are not limited to, device type or brand, user interface capabilities (e.g. screen resolution, size, colours), user input capabilities/limitations (e.g. scroll, mouse, keypad, etc.), processing power, memory size, and the like.

Depending on the type of information available, the access control module (or authentication engine) may implement one or more target analyses 1010, that may include, but are not limited to, identifying and providing the user access to content relevant to: their gender and/or age demographic, their interests (e.g. as interpreted from their social network profile); existing brand, company and/or product affiliations (e.g. as interpreted from their social network profile, bound user profiles and/or device profile); the type or venue location (e.g. travel content for an airport location vs. pharmaceutical advertising at a hospital, advertising or promotions specific to venues/services located near the network access location, advertising or promotions specific to other services/products offered at the access location, etc.); the frequency of user logins at a given location, or at different locations, and correlations with the type of information accessed thereby; and the type of content most suitable for the type of device being used, to name a few. Once analyzed, the user may be provided access to content deemed most relevant 1012, which may include for example, reference to a local boutique in the area of the accessed hotspot serving the user's demographics, and advertisement for a product and promotional event also geared thereto.

It will be appreciated by the person of skill in the art that different types of target content algorithms and/or procedures may be implemented in the present context, for example, as a function of the type of information either made available by different embodiments of the invention, or again, based on the different types of information made available by different users and user types. For example, some embodiments may be flexible in allowing both relatively anonymous users access to the network (e.g. users providing only their social networking credentials in exchange for access, or again providing limited access to, or full access to limited social networking profiles) as well as relatively well identified users access to the network, in some instances, to whom further or enhanced privileges are provided (e.g. bound user and/or device profiles, identified user affiliations, extensive social networking profiles, etc.). In other embodiments, all users may be provided with the same access privileges based on a same limited level of identification, for example, in an embodiment where only the user's social networking credentials are exposed and the system is not adapted to access, extract and/or combine further information on the user. These and other such examples are therefore not intended to depart from the general scope and nature of the present disclosure.

Referring now to FIG. 11, and in accordance with one embodiment of the invention, a system, generally referred to using the numeral 1100 and in accordance with one embodiment of the invention, will now be described. In this embodiment, the system 1100 is again generally configured and designed to provide a user of a remote network enabled device 1102 access to online services, resources and/or applications over a communication network 1104. In this embodiment, the system generally comprises a network access device 1106 (for example embodying a network access module or the like, as shown in FIGS. 1 and 2B) for establishing wireless communication with the network enabled remote device 1104, through which online services may ultimately be provided upon successful user and/or device authentication. The network access module, in this embodiment, forwards all unauthenticated network traffic to a network authentication engine 1108, for example embodied within or embodying an access control module or the like, as shown in FIGS. 1 and 2C. It will be appreciated that the authentication engine 1108 can be implemented locally as an integral component of the network access device, or remotely through one or more dedicated, distributed or shared network-enabled computational resources. In general, the network authentication engine 1108 is at least in part responsible for granting or denying network access to individual users and/or devices. For example, and as described above, network access may be granted based on social network profile authentication alone, or in combination with a social profile authenticity verification process, and/or in combination with other user and/or device credential authentication processes, for example provided via bound network access profiles. Furthermore, different embodiments may implement different user profiling or targeting algorithms or rules to optionally tailor the user's networking experience based on one or more profile attributes, for example.

For the purpose of illustration, the authentication engine is diagrammatically depicted in FIG. 11 as comprising stored or programmed therein, an identity verification module 1112 that has communicative access to one or more network enabled devices 1114 implemented by affiliated social network service providers. For example, the identity verification module may be configure to authenticate or enable authentication of the user's social networking credentials with one of the affiliated SNSPs. For example, and as discussed above, network access may be provided to the user upon confirmation by the SNSP of the existence of a social network profile associated with the entered social networking credentials.

In addition, the authentication engine may further comprise an authentication rules module 1110 having embodied or stored therein a series of authentication rules designed and optionally implemented to automatically govern or dictate user access authorizations and/or tailor the user's networking experience. For example, the authentication rules can be implemented in association with the identity verification module, wherein social networking credential-based authentication is further implemented as a function of preset authentication rules defined therefor. As discussed above, these rules may be satisfied, for example, provided the social network profile associated with the entered social networking credentials meets certain legitimacy or authenticity thresholds to warrant the provision of full access privileges to the user.

Furthermore, or alternatively, the authentication rules may be implemented in association with a profile management module 1116 configured to combine and leverage previously or concurrently accessed data for network access authentication and tailoring. For example, the profile management module may be configured to access, populate and retrieve various profiles stored in data repository or knowledge base 1118, for example, comprising one or more of pre-existing user profiles (e.g. partner or affiliated account), device profiles and/or hotspot profiles (e.g. hotspot related data), as well as historical and/or relational network access data, to name a few. It will be appreciated that while such data is depicted herein as stored within the data repository, such data may also be accessed in real-time upon network access initiation and/or throughout a user's session (e.g. automatically accessed device, user and/or hotspot-related data). For example, as described above, user access privileges may be defined or tailored as a function of this data, combinations and/or relationships therebetween, and/or as a function of relationships identifiable between this data and the social profile data accessed from the SNSP.

For example, the profile management module may provide a mechanism for linking various disparate types of credentials with a particular user and/or device (e.g. link a user's Facebook account to his Bell Mobility subscription), consult the knowledge base (i.e. data repository) in order to match the current user/device with an existing user and/or device profile, and/or consult the knowledge base to discover other historical connections such as previous access times/places, the credentials used, etc., which can be associated to the current user/device and ultimately, the social networking credentials being used for authentication.

In accordance with one embodiment, the authentication rules module can be configured and programmed to enforce different numbers of authentication rules in applying different network access parameters, constraints and/or privileges, which may include, but are not limited to, what types of connection options are offered to a particular device (e.g. different options may be offered to an iPhone user vs. a laptop user); what types of credentials/accounts are permitted at a particular location or time of day; what conditions must to be met by the social profile (e.g. Facebook profile user must have 10 or more friends associated therewith, Rogers Cable user must be subscribed to the High Speed Ultra service, etc.), and the like. As will be appreciated by the person of ordinary skill in the art, the authentication rules module may be used in conjunction with either, both or none of the related modules, in order to accomplish its task of processing preset authentication rules and deciding whether to grant network access to the user/device, and if so, optionally, how to tailor such access in accordance with different user profile attributes.

With reference to FIGS. 1 and 11, the systems 100, 1100 may be implemented over various different types and combinations of networks 104, 1104 providing for the communicative interfacing of a given remote device 102, 1102, network access module 106 or device 1106, access control module 112 (or authentication engine 1108) and social network authentication module 116 (e.g. network-enabled SNSP devices 1108). For example, the network may comprise a combination of networks conducive to provide a user access to a diversity of online services, resources and/or applications. For example, network access may be provided to Sling Media™, which allows a user to connect to their home Slingbox™ device from a remote location; Sony™ Location Free TV, which allows a user to connect to their home Location-Free TV (LFTV) from a remote location; and/or Orb Networks™, which allows a user to connect to their home Orb™ server and retrieve content from their home server from a remote location. Access to other Internet, Web-enabled and/or network services may also be contemplated, including, but not limited to email and messaging services, media access services, gaming services, business collaboration software, social applications, and the like.

In one embodiment, the system comprises or is implemented within a single-cell hotspot wireless network, generally comprising a local area network (LAN) or the like limited to a relatively small spatial area such as a room, a single building, a ship, or an aircraft, otherwise commonly referred to as a single location network.

In another embodiment, the system comprises or is implemented within a wide area network, such as, but not limited to a muni-Wi-Fi network or the like, and is implemented using one or more of a variety of technologies such as a strand-mounted network, a mesh network, and the like. A wide area network could comprise, for example, a metropolitan area network (MAN) that connects two or more LANs together but typically does not extend beyond the boundaries of the immediate town, city, or metropolitan area. Multiple routers, switches, and/or hubs can be connected to create a MAN usable in the present context.

In another embodiment, the system comprises or is implemented within a wide area network (WAN), such as, but not limited to a WiMAX Network or the like. A WAN could comprise, for example, a data communications network that covers a relatively broad geographic area using transmission facilities provided by common carriers, such as telephone companies, interne companies, and other such communication service providers.

It will be understood by the person skilled in the art that various other types and combinations of networks, either currently implemented or developed in the future to facilitate communications over diverse geographical areas, may be considered herein without departing from the general scope and nature of the present disclosure.

Again with reference to FIGS. 1 and 11, and in accordance with some embodiments of the invention, a remote device 102, 1102, such as a wireless device, is a device having the ability to communicate with other devices without having physical contact with them. A remote device can be an electronic device operable as a wireless interface between a user or another electronic device and a network or wireless access point, such as provided at a hotspot or within a wireless network coverage area. A remote device may include, but is not limited to, laptops, Personal Digital Assistants (PDA), Smart phones (e.g. Apple™ iPhone™, HTC 5261, RIM Blackberry™ BOLD, etc.), browser-enabled wireless gaming devices such as the Sony PSP™ and other such devices currently available on the market, in development, or upcoming and based on similar communication platforms and technologies. A remote device may incorporate several functionalities such as those listed above. A remote device can be capable of communicating using one or more different communication modes, such as a combination Wi-Fi and/or cellular device. The person skilled in the art will appreciate that the system, as disclosed herein, is readily adaptable to new and upcoming devices, and as such, is considered to include such devices within the context of the present disclosure.

Figure 2A:
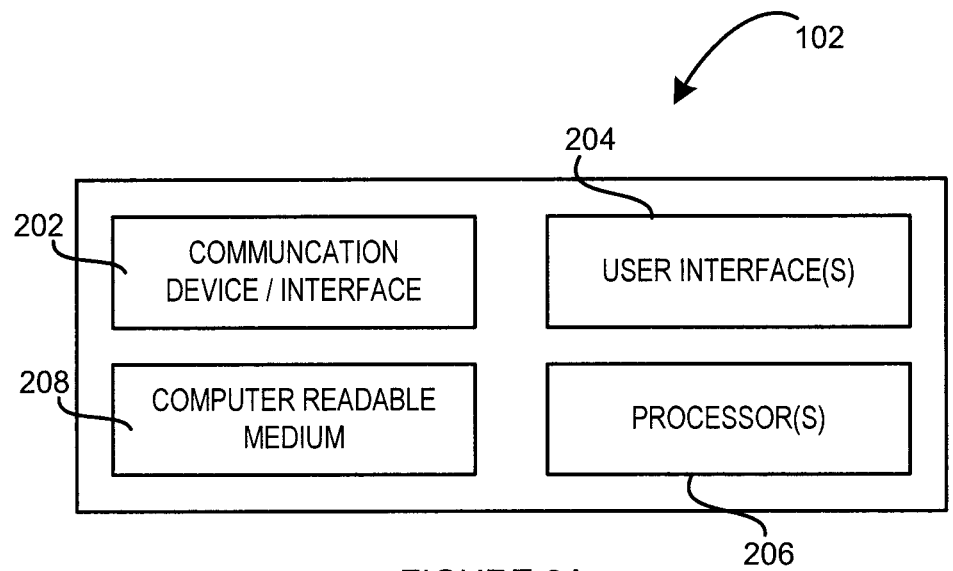
FIG. 2A is a high level diagrammatic representation of a remote device, in accordance with an embodiment of the invention.
Figure 2B:
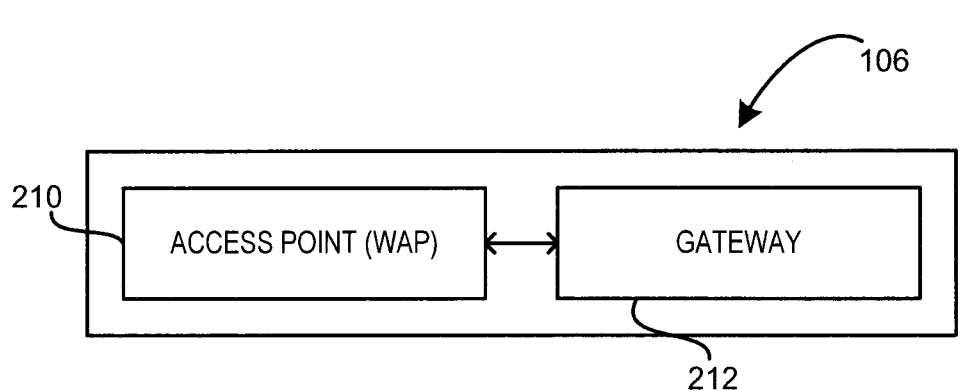
FIG. 2B is a high level diagrammatic representation of a network access module, in accordance with an embodiment of the invention.
Figure 2C:
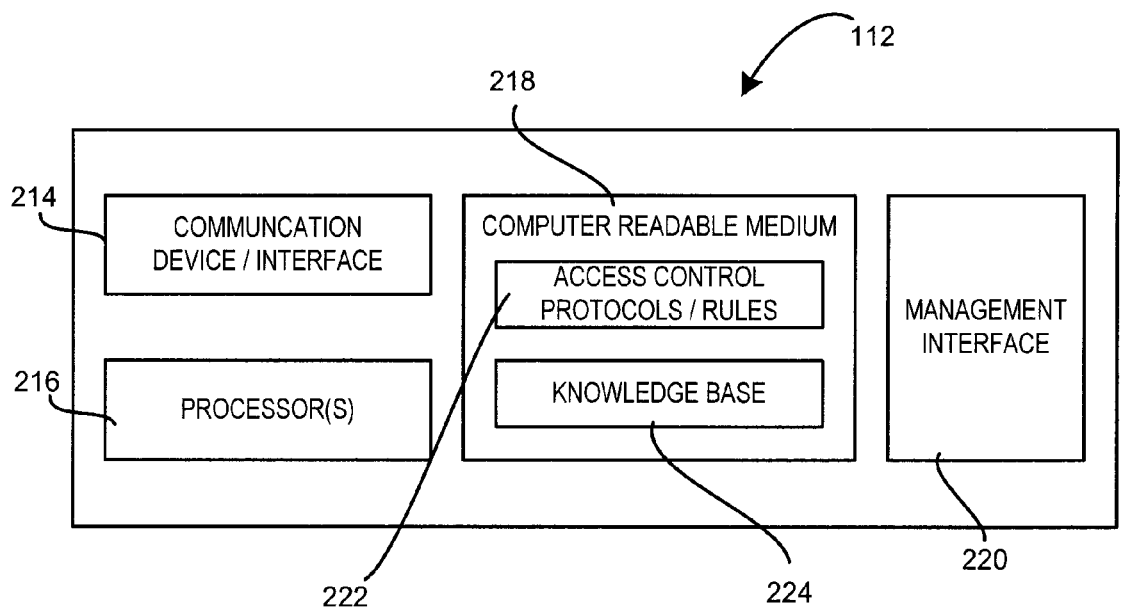
FIG. 2C is a high level diagrammatic representation of an access control module, in accordance with an embodiment of the invention.

With reference to FIGS. 1 and 2A, and in accordance with one embodiment, a remote device 102 is depicted as generally comprising a computer-readable medium or media 208 for storing statements and instructions for the operation of the device, and optionally for storing various forms of data useful in the implementation of device functions and/or accessible to the user of the device as needed; a communication means such as a communication device and/or interface 202 for interfacing with the network access module 106 and optionally, for direct communication with other similarly configured remote devices; one or more processors 206 for processing received and sent information and for implementing statements and instructions stored on the one or more computer-readable media 208; and a user interface (UI) 204, such as a graphical user interface (GUI), keyboard, keypad, game pad, mouse, scroll ball, touch screen, motion sensing user interface, speech recognition system, or the like for receiving input from the user directed to the operation of the device 102.

Other remote device elements and/or components, as would be readily apparent to the person skilled in the art, may also be considered herein without departing from the general scope and nature of the present disclosure. For instance, various hardware, firmware and/or software may be integrated or operationally associated with a given remote device 102 to achieve various functions and interface with the user and/or various services, resources and/or applications accessed thereby over the network 104. Also, various peripheral devices, such as supplemental user interfaces, data input and/or output means (e.g. printers, scanners, removable storage media, etc.), and the like may also be considered herein.

In one embodiment, the remote devices 102 may include browser-based devices, wherein such devices comprise a browser-based user interface 204, such as a Web browser or the like. Examples of browser-based devices may include, but are not limited to laptops, PDAs, and the like.

In other embodiments, the remote devices 102 may also include browser-challenged devices, wherein such devices comprise a browser-challenged user interface 204, such as for example, a microbrowser or the like, and/or comprise a sub-standard keypad (i.e. non-QWERTY keypad). In one example, a microbrowser is defined as a Web browser specially designed for a hand-held device and embedded within the software and/or firmware of this device. In this example, the microbrowser is generally optimized so as to display Internet content most effectively for small screens on portable devices and have small file sizes to accommodate the low memory capacity and low-bandwidth of such handheld devices. Examples of browser-challenged devices may include, but are not limited to, a Sony™ PSP™, a Smartphone (e.g. Apple™ iPhone™, HTC 5261, etc.), a Blackberry™, and the like. Content providers may, in some instances, be configured to provide pre-formatted content specifically for some or all browser-challenged devices.

The person of ordinary skill in the art will appreciate that other browser-based and browser-challenged devices, as well as other types of devices operatively configured for interactive communications over the Internet or other such communication networks through means other than browser-like technologies, may be considered herein without departing from the general scope and nature of the present disclosure.

This person will further appreciate that, although the above examples have been described with reference to distinct categories, other categories may also be contemplated based on each device's functionality, operability and user interface characteristics. Furthermore, it will be understood that certain devices may be best described as falling between the above categories, and that such devices are considered within the context of the disclosed system.

Figure 2D:
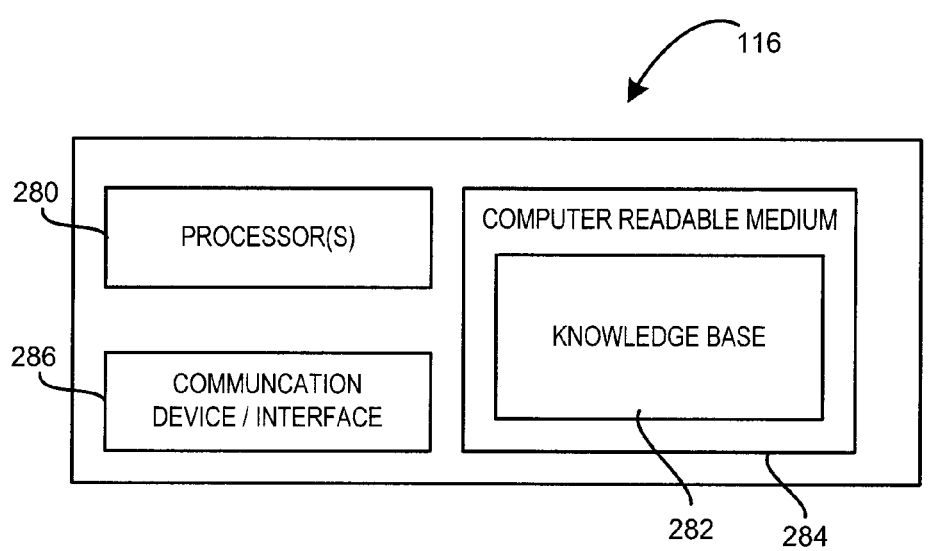
FIG. 2D is a high level diagrammatic representation of a social network authentication module, in accordance with an embodiment of the invention.

With reference to FIGS. 1 and 2D, and in accordance with one embodiment of the invention, the social network authentication module 116 generally comprises one or more processors 280, a knowledge base 282 (e.g. a structured collection of records or data) stored and maintained within one or more computer-readable media 284, and one or more communication interfaces and/or devices 286, wherein user credentials can be received via the communication interface and compared by the processor with registered social networking profiles stored in the knowledge base for authentication. As will be appreciated by the person of skill in the art, while the input of user credentials is generally provided through the remote device 102, various user, application and/or network interfaces may be implemented to enable the transfer of these credentials to the social network authentication module 116 for authentication. For example, the user may be provided with a generic interface from the access control module 112 of the WNAP, from which input credentials may be communicated to the authentication module 116 for authentication. In another example, a SNSP-specific application protocol interface (API) is implemented locally on the remote device 102 (e.g. Facebook Connect API), and configured to communicate directly with the authentication module 116, the access control module 112 enabling such communication over the network 104 via the network access module 106 to accommodate the authentication process. Alternatively, the remote device and/or access control module may communicate directly with a login server or the like of the SNSP, which embodies the authentication module. As will be appreciated by the person of skill in the art, various implementations of the social network authentication module may be implemented, combining different data communication paths and the implementation of different communication and/or application interfaces to enable the transmission and authentication of the user credentials. Furthermore, it will be appreciated that the steps and detailed implementation of social network authentication may be implemented centrally by a login server, for example, implemented by the social network service provider, or again distributed over one or more servers, the remote device, the access control module, the network access module and/or other communicatively linked or integrated modules, and that, without departing from the general scope and nature of the present disclosure.

Once authenticated, in one embodiment, the authentication module 116, or another social network module associated therewith or communicatively linked thereto, will provide the access control module 112 (or other WNAP/partner modules associated therewith or communicatively linked thereto) access to at least a portion of the user's social network profile, for example stored in a same or distinct knowledge base, thereby allowing the WNAP to further verify the legitimacy of the user's credentials and/or leverage the user's information, for example, as described above.

With reference to FIGS. 1 and 2B, and in accordance with one embodiment, the network access module 106 of the system 100 generally comprises a wireless access point (WAP) 210 and a gateway 212. In this embodiment, the WAP 210 comprises a device configured to connect different wireless communication devices together to form a wireless network, and further connect to one or more wired or wireless networks (e.g. network 104), namely via gateway 212, to relay data between remote device(s) 102 and downstream wired and/or wireless devices.

In one embodiment, the WAP 210 reacts substantially immediately when a remote device 102 scans for an available network. For example, the WAP 210 can react to the device scan by communicating to the device 102 that there is an available network connection through the network access module 106.

In one embodiment, the gateway 212 can be used to communicate between a remote network and another network, which, in the present context, may provide access to the access control module 112 and/or social network authentication module 116. In this embodiment, the gateway 212 comprises a device configured to communicate between two or more networks, which may, for example, use different network protocols (e.g. wireless network protocols, wired network protocols, etc.). Examples of gateways 212 operable within the context of system 100 may include, but are not limited to, Colubris Controllers (e.g. MSC-3200), Cisco™ WLAN Controllers (e.g. Cisco™ 2000, 4100 WLAN Access Controller), and Mikrotik™ RouterOS, to name a few.

In one embodiment, the gateway 212 may intercept the request to access the network 104 and redirect the request back to the device 102 through a web browser for the user to input user information, such as social networking credentials and optionally other information relevant to the identification of the user, the type of services they may wish to access, the different associations, credentials, accounts and/or promotional packages they may wish to rely on for authentication and/or gain further access privileges from, and the like, as described herein and as will be readily appreciated by the person of skill in the art from the present disclosure.

For example, the request may be redirected as a WNAP-specific identification interface, wherein data entered by the user is communicated directly to the control module 112 for processing. In one such example, the data entered through this interface includes social networking credentials associated with a SNSP, wherein the control module 112 then proceeds to authenticate these credentials directly with the authentication module 116 implemented remotely by the SNSP. In another embodiment, the WNAP identification interface requests that the user select one of two or more SNSPs with which they maintain a social networking profile, and then provide credentials associated therewith; the control module can then proceed to authenticate these credentials with the selected SNSP.

In yet another embodiment, the WNAP-specific identification interface only requests that the user select a preferred SNSP, in response to which, the control module may then proceed to provide the user with limited access to the online services provided by the selected SNSP, for example, providing the user with access only to the SNSP's dedicated authentication module, which may for example, be implemented remotely on a login server of the SNSP, or again implemented locally on the device via an authentication API configured to communicate social networking credentials to the SNSP's authentication module. In either case, or others similar thereto as will be appreciated by the person of skill in the art, the control module 112 may monitor the authentication of the user's credentials, and provide the user with further network privileges upon successful authentication.

As will be appreciated by the person of skill in the art, social networking credentials can include, but are not limited to, user credentials with respect to a given or selected one of plural SNSPs (e.g. a username and password, account number, associated e-mail address, nickname, etc.). In one embodiment, the authentication of social networking credentials with the SNSP suffices to provide the user access to the network. In other embodiments, however, the control module 112 is configured to gain access to at least a portion of the user's social network profile, which can be used not only to populate demographic reports generated by the WNAP for self and partner initiated advertising and/or promotional ventures, but also to further verify the legitimacy of the user's social network profile to restrict access only to genuine, or at least perceptively genuine users.

As presented above, however, the system may be further configured to extract device information and/or request further user identification information, for example, to bind a user's one or more social networking profile with one or more other user and/or device profiles. For example, as described above, the identification interface may further invite the user to provide credentials associated with one or more associated and/or partnered accounts, for example as an incentive to gain further access privileges and/or promotional services and/or offers online. In exchange the WNAP and its partners may gain further access to user information for various targeted advertising and/or promotional advantages.

Also, as described above, and as described in detail in Applicant's international patent application publication no. WO 2008/148191, device-specific identification data may also be extracted automatically from communications with the device, again providing possible access to and credential binding with a user's device profile, for example as pre-registered and/or maintained by the WNAP or one of its partners. Such device information may include, but is not limited to, the Media Access Control (MAC) address of the device 102, traffic type (e.g. communication port, data type, communication protocol, traffic headers, etc.), browser type (e.g. full browser, microbrowser, browser origin and/or configuration, etc.), and/or some other unique identifier (e.g. device configuration, serial number, signature related to a device clock or crystal oscillator, etc.). This and related device information can be associated with a device profile and thereby retrieved to bind this device profile with the entered social networking profile.

For example, in one embodiment wherein device identification is enabled, while the user attempts to access the network using social networking credentials, the network access module 106, or the gateway 212 thereof, can access, forward and/or store device-specific information in relation to the provided social networking credentials. For example, in one embodiment, an SNMP Trap is provided, such as but not limited to the KIWI SNMP Trap, to monitor network-attached devices for conditions that warrant administrative attention. For example, gateway 212 can detect what type of device is being used through key unique attributes of the device, for example, MAC address (including manufacturer prefix), host IP address, and other properties that can be obtained remotely through special features in the network access module 106. For example, UTStarcom™ smartphones generally include HTTP headers such as "UA-pixels: 240× 320" or "x-wap-profile:http://www.htemms.com.tw/gen/apache-2.0.xml".

Depending on what type of device is detected and/or what type of browser is being used, as explained above, the accessed user interface can automatically reformat to suit the type of device and/or browser being used. If the user has already registered for a device account with the WNAP or one of its partners, for example stored as a device or bound profile, the system 100 will recognize the user and device and proceed to bind the user's social networking profile to their pre-registered user and/or device profile without further input from the user, which can, in some embodiments, automatically provide the user with the access privileges defined by their pre-registered profiles. If, however, the user has not registered for a device account, or has not previously registered that particular device, the browser may proceed with social networking credential authentication only, for example, without necessarily being aware that a device identification process is being implemented in the background.

Accordingly, the system may not only grant access based on social network authentication, but also based on various other attributes, which can be used in combination to provide customized access to the user, which may include, but is not limited to, wide open access, and restricted access based on a number of access authorization criteria, which may depend on the device type, the device configuration, the specific device, the specific user, the user's associations, the user's social network profile or a portion thereof, and/or other criteria, or combinations thereof.

It will be appreciated by a person skilled in the art that the functions implemented by the network access module may be provided by a combination of a WAP 210 and gateway 212, or applied using other device architectures, known or developed, to provide such functionality. Furthermore, though some of the above examples contemplate forwarding device communications to the control module 112 for identifying device-specific data extraction, it will be appreciated that the network access module may also be configured and adapted to extract such information from device communications and forward this information to the control module, or to other modules of the system for processing, without departing from the general scope and nature of the present disclosure.

With reference to FIGS. 1 and 2C, and in accordance with one embodiment of the invention, the system 100 comprises one or more access control module(s) 112 configured to communicate with the network access module(s) 106 to operatively identify, authenticate and authorize one or more remote devices 102 access to the communication network 104.

In the example illustrated in FIG. 2C, the control module 112 generally comprises a computer-readable medium or media 218 for storing statements and instructions for the operation of the module 112, and for storing various forms of data useful in the implementation of module functions and management of the control module 112; a communication means such as a communication device and/or interface 214 for interfacing with the network access module 106 through the network 104 and optionally, for direct communication with a social network authentication module 116 and/or other online services, resources and/or applications, for example, as provided by different WNAP partners; one or more processors 216 for processing received and sent information and for implementing statements and instructions stored on the one or more computer-readable media 218; and an optional management interface 220, such as a graphical user interface (GUI), keyboard, keypad, mouse, scroll ball or the like for receiving input from a system manager directed to the management of the control module 112.

It will be appreciated that other control module elements and/or components, as would be readily apparent to the person skilled in the art, may also be considered herein without departing from the general scope and nature of the present disclosure. For instance, various hardware, firmware and/or software may be integrated or operationally associated with the control module 112 to achieve various functions and interface with the remote device(s) 102, the network access module 106 and/or various online services 114 accessed thereby over the network 104. Also, various peripheral devices, such as supplemental user interfaces, data input and/or output means (e.g. printers, scanners, removable storage media, etc.), and the like may also be considered herein. It will be further appreciated that the control module 112 may be implemented centrally, in a distributed architecture, or in a combination thereof to achieve a desired functionality and level of complexity.

In the embodiment depicted in FIG. 2C, the computer readable medium 218 of the control module 112 comprises network access control protocols and/or rules 222 and an optional knowledge base 224, wherein the latter can be defined as a structured collection of records or data that is stored on the computer readable media 218. As will be described below, when a user requests access to the network using social networking credentials, information relating to the user's credentials, and optionally related to the user's social network profile, related or unrelated user profiles and/or device profile can be stored by the control module 212, for example in knowledge base 224. Information retrieved and stored may include in different embodiments, such information as, but not limited to, user name, user password, account number, device type, MAC address, browser information, device configuration, service packages and/or user, device and service profiles, and the like, in different combinations. The database may also contain information regarding the hotspot access point (e.g. the specific network access module 106 implemented), for example, but not limited to, the hotspot access configuration and location information.

In some embodiments, device information such as device types, MAC addresses, browser information, device configuration, clock or crystal oscillator information, serial numbers, and the like, is used to create or authenticate a user's device profile, which can be used, for example, to identify, track, manage, and report on devices by device type, device model, or specific instance of a device. In some embodiments, for registered devices, device types, or device classes, a copy of the device profile can be stored for access by the control module, for comparison with characteristics of devices attempting to connect to services through the network access module using social networking credentials, for supplemental, complimentary or redundant identification, authentication and authorization purposes. User or device access can be configured based on the device profile to allow access to be tailored toward the device, or to access privileges with ownership of selected devices or subscription to selected service providers, for example.

In some embodiments, the knowledge base 210 is a relational database. A relational database refers to a type of database wherein a table stored in the database comprises rows and columns that are populated with information retrieved from the network access module 106 (e.g. access point 210 and gateway 212 of FIG. 2B). In a relational database, there are generally one or more tables containing stored information, which may be interrelated through one or more qualified connecting values so that information can be shared between tables.

As introduced above with reference to FIG. 9, and in accordance with some embodiments, device information may be stored in the knowledge base 224 in the form of a device profile, generally comprising an account variable that refers to characteristics of a remote device that allows for recognition and identification of a specific device, which may include, but is not limited to, known requirements of that device for connecting to the Internet, for example. In one embodiment, device information is collected when a user attempts to access the network via a given network access module 106, or when a user pre-registers for a device account, and is stored in the knowledge base 224.

In some embodiments, user information may also or alternatively be stored in the knowledge base 224 in the form of a user profile, generally comprising an account variable that refers to information about the user retrieved from the user, including for example, but not limited to, the user's social networking credentials, but also optionally the user's name, contact information, social network profile information (e.g. contacts, friends, preferences, interests, activities, etc.) and the like. In one embodiment, user information is collected from the user upon social network authentication, when a user pre-registers for an account and associates the social networking credentials with this account, or again extracted automatically from the user's social network profile upon authentication; this information is generally stored in a database for later use.

In some embodiments, a service profile can also be stored in the knowledge base 224, generally comprising an account variable created by a combination of one or more of a social network profile, a device profile, a user profile, user affiliations, and associated devices, for example. For instance, while certain access privileges may be provided based on social networking credentials alone, additional privileges may be provided upon identification that these credentials as bound with registered or stored profile affiliations, thereby customizing the user's access privileges based on known affiliations or attributes of the user's profile.

For instance, in some embodiments, a service profile may be associated with a group of authorization constraints, authorization whitelist attributes, or a combination thereof. The authorization constraints can specifically deny or block predetermined services or aspects thereof, while authorization whitelist attributes can specifically allow or enable predetermined services or aspects thereof.

For example, in some embodiments, access to selected functions and services may be extended to all users of a given device type, or to all users of a given group or adhering to a same promotional package or the like, without further registration and/or subscription by the user of a given social network. For example, all members of a given social network who use credentials associate with this social network could be entitled to access one or more selected functions and/or services.

In some embodiments, optional user and/or device profiles are managed, for example, by a security management module and/or access management module, to reduce or deal with potential fraud, device theft, password theft, or other misuse, and to improve user experience and access control. For example, information or suspicious activity can be logged, tracked and reported to assist customers in managing fraud, theft or other misuse. For example, each user can create a single, centralized account listing using their social networking credentials. The user can subscribe to or set restrictions on services or applications, locations, service providers, or set other access profile parameters. These parameters and other settings can be used to supply users with fast, convenient, predictable and secure service at controlled costs. Users can self-manage their accounts, for example by reviewing service history or access attempts using convenient analysis tools. Alternatively, users can subscribe to a service which manages their accounts for them.

Service profile parameters can be dependent on other factors such as date, time of day, device type or device class, location, hotspot or business operators or venues, service profiles, simultaneous usage of devices by a user, session idle time or timeouts, time from expiration of prepaid or introductory service, customer loyalty, payment history, and other factors that would be understood by a worker skilled in the art. For example, frequent or preferred customers, or customers who are the focus of a marketing campaign or promotional partnership agreement, may be given temporarily enhanced services for business purposes.

Accordingly, the system 100, via the network access module 106, or gateway 212 thereof (FIG. 2B), can be configured to restrict the user/device to actions determined by the user's profile (i.e. social network authentication profile, specific attributes of user's social networking profile identified upon authentication, bound user/device profiles, etc.), for example, by setting up firewalls, allowing or blocking specified TCP or UDP ports, filtering or restricting network traffic based on type, packet headers, content, flow characteristics such as rate, delay and variation thereof, source, destination and/or other access limitation rules to be implemented by the system 100. Alternatively, or based on one or more user profile characteristics, wide-open access may be provided.

In another embodiment, access constraints can be configured to enable or disable selected applications or groups of applications, either directly according to application name or type, or indirectly by setting minimum or maximum service levels for selected services such as bandwidth, delay, enabled or disabled TCP or UDP port numbers, firewall settings, and the like, where said service levels are required for certain degrees of performance of selected applications.

In one embodiment, in order to influence or control access to pre-specified applications or services, different applications or services can be profiled. To profile an application or group of applications, the type and level of communication resources associated with usage of said application or group of applications is determined, such as TCP or UDP port usage, bandwidth, packet size, traffic characteristics, and the like. This association can be performed through controlled experimentation or monitoring of customer activity. The association between applications and type and level of communication resources is then stored in an application profile in a knowledge base. The application profile can subsequently be used to substantially monitor and/or restrict users to predetermined applications or groups of applications by monitoring and/or restricting access or usage to the associated types and levels of communication resources. Profiling of applications can be performed automatically according to an adaptive or automated procedure, or by a network administrator, or by a combination thereof.

As will be appreciated by the person of skill in the art, providing limited access to, for example, user's authenticated solely by their social networking credentials, may encourage such users to bind these credentials with one or more partner accounts, wherein such binding options may be offered automatically to the user upon accessing the network from a given network access module. For example, the social network authenticated user may be invited to bind their credentials with partner account, or be provided with the option of registering a new account with the WNAP and its partners. This may thus allow for binding of a user-specific and/or device-specific account with the WNAP, where future authentications based solely on social networking credentials may in fact provide the user with additional access privileges based on the bound profiles. The provision of different access restrictions, for example via one or more value based application packages and/or promotions, is detailed in Applicant's international patent application publication no. WO 2008/148191, can be readily applied in the present context without departing from the general scope and nature of the present disclosure.

It is clear that the described embodiments of the invention are exemplary and can be varied in many ways. Such variations are not to be regarded as a departure from the spirit and scope of the invention, and all such variations, as would be obvious in the art, are intended to be included within the scope of the following claims.

We claim:

1. A method for providing wireless network access to a user of a remote device to a wireless network at a hotspot, the method comprising:
    establishing wireless communication with the remote device at the hotspot to enable wireless transmission therefrom of social networking credentials associated with a pre-existing personal social network profile, wherein said personal social network profile was previously created by the user on a third party social network operated by a third party social network service provider, and wherein said personal social profile is sharable with other social network users via their respective personal social network profiles that are associated with said personal social profile by the user via said social network;
    using said social networking credentials, authenticating the user with said third party social network service provider, wherein authenticating the user comprises assessing social profile data associated with said pre-existing personal social network profile and automatically generating a legitimacy assessment of said social network profile based on said social profile data;
    providing the user with wireless access to the wireless network at the hotspot as a result of authenticating the user, wherein said wireless access is tailored based at least in part on the legitimacy assessment by adjusting at least one of an access bandwidth or access time as a function of the legitimacy assessment; and
    creating an update to said personal social network profile, wherein said update identifies the user as being currently located at a location of the hotspot.

2. The method according to claim 1, wherein said authorizing comprises further tailoring access privileges as a function of said legitimacy assessment.

3. The method according to claim 1, further comprising further tailoring said wireless access as a function of said social profile data.

4. The method according to claim 3, wherein said further tailoring comprises automatically directing the remote device to tailored content.

5. The method according to claim 3, further comprising accessing one or more of remote device-related data and user-related data, and binding said accessed data with said social profile data in a combined network access profile, wherein said wireless access is further tailored as a function of said combined network access profile.

6. The method according to claim 1, further comprising accessing hotspot-related data, and further tailoring said wireless access as a function of said hotspot-related data.

7. The method according to claim 6, wherein said legitimacy assessment comprises automatically identifying a relationship between said social profile data and said hotspot-related data, and wherein said wireless access is tailored at least in part as a function of said relationship.

8. The method according to claim 1, further comprising accommodating, as a result of said authenticating the user, invitation of the user to establish a relationship on said personal social network profile with an entity associated with said location, wherein establishment of said relationship results in creation of a reference to said entity on said personal social network profile visible to at least some of said other social network users.

9. The method according to claim 1, further comprising associating said social networking credentials with a pre-existing user profile, thereby enabling network access authentication as a function of said pre-existing user profile using said social networking credentials.

10. The method according to claim 9, wherein said pre-existing user profile comprises affiliated user credentials associated with an affiliated service provider distinct from said social network service provider, whereby network access authentication initiated via said social networking credentials is completed via said affiliated user credentials.

11. The method according to claim 1, further comprising inviting the user, once authenticated via said social networking credentials, to submit affiliated user credentials associated with an affiliated service provider, and associating said affiliated user credentials with said social networking credentials.

12. The method according to claim 11, further comprising, upon subsequently initiating wireless network access via said social networking credentials, automatically authenticating the user via said affiliated user credentials.

13. The method according to claim 11, further comprising reporting on user network access to said affiliated service provider.

14. The method according to claim 1, wherein the method is automatically implemented by a computerized system communicatively linked to the remote device and to a network-enabled social networking device implemented by the social network service provider.

15. The method according to claim 1, wherein said update is visible to at least some of said other social network users.

16. The method according to claim 15, wherein said update comprises visibly identifying the user as being currently located at said location or at an establishment associated with said location.

17. The method according to claim 1, wherein said social network is Facebook™, wherein said personal social network profile is a personal page associated with the user on Facebook™, and wherein said other users are associated with the user on Facebook™ as friends of the user.

18. The method according to claim 1, wherein said legitimacy assessment comprises automatically identifying a relationship between said social profile data and said location or an establishment associated with said location, and wherein said wireless access is tailored at least in part as a result of said relationship.

19. The method according to claim 1, wherein said wireless access is further tailored based at least in part on said location by adjusting at least one of said access bandwidth or said access time as a function of said location.

20. A system for providing wireless network access to a user of a remote device to a network at a hotspot, the system comprising:
 a wireless access point (WAP) having hardware configured to establish wireless communication with the device to enable wireless transmission therefrom of social networking credentials associated with a pre-existing personal social network profile, wherein said personal social network profile was previously created by the user on a third party social network operated by a third party social network service provider, and wherein said personal social network profile is sharable with other social network users that are associated with the user via said social network via respective personal social network profiles; and
 an authentication engine communicatively linked to said hardware and configured to accommodate authentication of the user using said social networking credentials with said third party social network service provider and provide wireless network access to the user via said WAP as a result of authenticating said social networking credentials;
 wherein said authentication engine computes an authenticity score for association with said social networking credentials,
 wherein said wireless access is tailored based at least in part on said authenticity score by adjusting at least one of an access bandwidth or access time as a function of the authenticity score, and
 wherein said personal social network profile is updated to identify the user as being currently located at a location of the WAP.

21. The system according to claim 20, wherein said authentication engine is configured to provide the remote device limited wireless access over the network to a social network authentication processor and knowledge base to accommodate said authentication of the user, wherein said social network authentication processor and knowledge base are configured to authenticate said credentials.

22. The system according to claim 20, wherein said authentication engine is configured to communicate said credentials to a social network authentication processor and knowledge base for authentication.

23. The system according to claim 20, wherein said authentication engine is further configured to receive as input one or more social profile data elements associated with said social network profile distinct from said credentials, and process said one or more social profile data elements against a programmed set of authentication rules to selectively authorize access to the network upon said one or more social profile data elements satisfying one or more of said rules.

24. The system according to claim 20, wherein said wireless access is only authorized upon said authenticity score exceeding a predefined threshold.

25. The system according to claim 20, wherein said authenticity score is computed based on one or more attributes of said personal social network profile being verified as true.

26. The system according to claim 25, wherein said one or more attributes comprise an identifiable relationship between said personal social network profile and said location or an establishment associated with said location.

27. The system according to claim 20, further comprising a knowledge base for storing one or more pre-existing profiles associated with the user, said pre-existing profiles comprising one or more of a device profile and an affiliated user profile, wherein said authentication engine is further configured to bind said social networking credentials with said pre-existing profiles in a combined network access profile to tailor said wireless access as a function of the combined network access profile.

28. The system according to claim 20, further configured to automatically detect device-related data embedded within device transmissions, said authentication engine being further configured to generate a device profile based on said device-related data for association with said social networking credentials and further tailor said wireless access as a function of the device profile.

29. The system according to claim 20, wherein the system is further configured to accommodate, as a result of authenticating said social network credentials, a user invitation to establish a relationship on said personal social network profile with an entity associated with said location, wherein establishment of said relationship results in creation of a reference to said entity on said personal social network profile visible to at least some of said other social network users.

30. The system according to claim 20, wherein said personal social network profile is visible to at least some of said other social network users.

31. The system according to claim 30, wherein said personal social network profile visibly identifies the user as being currently located at said location or at an establishment associated with said location.

32. A non-transitory computer-readable medium comprising statements and instructions for implementation by a computing system in authenticating a user of a remote device at a hotspot for providing wireless network access to a wireless network thereto, in accordance with the following:
  receiving as input social networking credentials associated with a pre-existing personal social network profile, wherein said personal social network profile was previously created by the user on a third party social network operated by a third party social network service provider, and wherein said personal social network profile is sharable with other social network users that are associated with the user via said social network via respective personal social network profiles;
  using said social networking credentials, authenticating the user with said third party social network service provider, wherein authenticating the user comprises assessing social profile data associated with said pre-existing personal social network profile and automatically generating a legitimacy assessment of said social network profile based on said social profile data;
  providing the user with wireless access to the wireless network at the hotspot as a result of authenticating the user, wherein said wireless access is tailored based at least in part on the legitimacy assessment by adjusting at least one of an access bandwidth or access time as a function of the legitimacy assessment; and
  creating an update to said personal social network profile, wherein said update identifies the user as being currently located at a location of the hotspot.

33. The non-transitory computer-readable medium according to claim 32 embodying an authentication engine programmed to tailor said wireless access as a function of said social profile data accessible thereto.

34. The non-transitory computer-readable medium according to claim 33, wherein said authentication engine is further programmed to tailor said wireless access as a function of one or more of device-related data, hotspot-related data and affiliated user-related data accessible thereto.

35. The non-transitory computer-readable medium according to claim 32 embodying an authentication engine programmed to process said social profile data accessible thereto as a function of pre-set authentication rules and selectively authorize said wireless access to the user as a function of said social profile data.

36. The non-transitory computer-readable medium according to claim 32, further comprising statements and instructions to automatically accommodate a user invitation to establish a relationship on said personal social network profile with an entity associated with said location, wherein establishment of said relationship results in creation of a reference to said entity on said personal social network profile visible to at least some of said other social network users.

37. The non-transitory computer-readable medium according to claim 32, wherein said update is visible to at least some of said other social network users.

38. The non-transitory computer-readable medium according to claim 37, wherein said update comprises visibly identifying the user as being currently located at said location or at said establishment associated with said location.

39. A method for providing wireless network access to a user of a remote device to a wireless network at a hotspot, the method comprising:
  establishing wireless communication with the remote device at the hotspot to enable wireless transmission therefrom of social networking credentials associated with a pre-existing personal social network profile, wherein said personal social network profile was previously created by the user on a third party social network operated by a third party social network service provider, and wherein said personal social profile is sharable with other social network users via their respective personal social network profiles that are associated with said personal social profile by the user via said social network;
  using said social networking credentials, authenticating the user with said third party social network service provider, wherein authenticating the user comprises assessing social profile data associated with said pre-existing personal social network profile and automatically generating a legitimacy assessment of said social network profile based on said social profile data;
  providing the user with wireless access to the wireless network at the hotspot as a result of authenticating the user, wherein said wireless access is limited to at least one of a restricted access time or restricted online content upon said legitimacy assessment scoring below a predefined threshold; and
  creating an update to said personal social network profile, wherein said update identifies the user as being currently located at a location of the hotspot.

40. The method according to claim 39, wherein said update is visible to at least some of said other social network users, and wherein said update comprises visibly identifying the user as being currently located at said location or at an establishment associated with said location.

41. The method according to claim 39, wherein said legitimacy assessment comprises automatically identifying a relationship between said social profile data and said location or an establishment associated with said location.

42. A system for providing wireless network access to a user of a remote device at a hotspot, the system comprising:
  a wireless access point (WAP) having hardware configured to establish wireless communication with the device to enable wireless transmission therefrom of social networking credentials associated with a pre-existing personal social network profile, wherein said personal social network profile was previously created by the user on a third party social network operated by a third party social network service provider, and wherein said personal social network profile is sharable with other social network users that are associated with the user via said social network via respective personal social network profiles; and
  an authentication engine communicatively linked to said hardware and configured to accommodate authentication of the user using said social networking credentials with said third party social network service provider and provide wireless network access to the user via said WAP as a result of authenticating said social networking credentials;

wherein said authentication engine computes an authenticity score for association with said social networking credentials, wherein said wireless access is limited to at least one of a restricted access time or restricted online content upon said authenticity score being below a predefined threshold, and wherein said personal social network profile is updated to identify the user as being currently located at a location of the WAP.

43. The system according to claim 42, wherein said authenticity score is computed at least in part based on one or more attributes of said personal social network profile being verified as true, and wherein said one or more attributes comprise an identifiable relationship between said personal social network profile and said location or an establishment associated with said location.

* * * * *